(12) United States Patent
Sasajima et al.

(10) Patent No.: US 8,952,101 B2
(45) Date of Patent: Feb. 10, 2015

(54) CONJUGATED DIENE RUBBER, RUBBER COMPOSITION, CROSSLINKED RUBBER, TIRE, AND PROCESS FOR PRODUCTION OF CONJUGATED DIENE RUBBER

(75) Inventors: Tatsuo Sasajima, Tokyo (JP); Takeshi Karato, Tokyo (JP); Takeshi Sugimura, Tokyo (JP)

(73) Assignee: Zeon Corporation, Tokyo (JP)

( * ) Notice: Subject to any disclaimer, the term of this patent is extended or adjusted under 35 U.S.C. 154(b) by 25 days.

(21) Appl. No.: 13/580,765

(22) PCT Filed: Feb. 22, 2011

(86) PCT No.: PCT/JP2011/053824
§ 371 (c)(1),
(2), (4) Date: Aug. 23, 2012

(87) PCT Pub. No.: WO2011/105362
PCT Pub. Date: Sep. 1, 2011

(65) Prior Publication Data
US 2013/0012651 A1    Jan. 10, 2013

(30) Foreign Application Priority Data
Feb. 26, 2010   (JP) .................................. 2010-042244

(51) Int. Cl.
*C08L 9/00*    (2006.01)
*C08L 9/06*    (2006.01)
*C08C 19/44*   (2006.01)
*B60C 1/00*    (2006.01)
*C08L 15/00*   (2006.01)

(52) U.S. Cl.
CPC . *C08C 19/44* (2013.01); *B60C 1/00* (2013.01); *C08L 15/00* (2013.01)
USPC ................... 525/342; 525/333.1; 525/332.9; 524/575; 524/571

(58) Field of Classification Search
CPC ..................................................... C08L 9/00
USPC ........................... 525/342, 331; 524/571, 575
See application file for complete search history.

(56) References Cited

U.S. PATENT DOCUMENTS

| | | | |
|---|---|---|---|
| 6,355,728 B1* | 3/2002 | Kawazura et al. ............... 525/98 |
| 7,241,842 B2* | 7/2007 | Nakamura et al. ............. 525/342 |
| 7,674,856 B2* | 3/2010 | Tahara et al. .................... 525/89 |
| 7,700,693 B2* | 4/2010 | Karato et al. .................. 525/209 |
| 2002/0179218 A1 | 12/2002 | Pierre et al. |
| 2004/0152845 A1 | 8/2004 | Oshima et al. |
| 2004/0254301 A1 | 12/2004 | Tsukimawashi et al. |
| 2006/0155076 A1* | 7/2006 | Nakamura et al. ......... 525/331.9 |
| 2008/0275184 A1* | 11/2008 | Karato et al. .................. 525/105 |
| 2009/0124742 A1* | 5/2009 | Suzuki .......................... 524/403 |
| 2010/0280173 A1* | 11/2010 | Ozawa et al. .................. 524/588 |
| 2012/0270997 A1* | 10/2012 | Tanaka et al. ................. 524/572 |
| 2013/0012651 A1* | 1/2013 | Sasajima et al. .............. 524/575 |
| 2013/0267649 A1* | 10/2013 | Sasajima et al. .............. 524/575 |

FOREIGN PATENT DOCUMENTS

| | | |
|---|---|---|
| CN | 1530379 A | 9/2004 |
| JP | 9-110904 A | 4/1997 |
| JP | 2002-284814 A | 10/2002 |
| JP | 2003-171418 A | 6/2003 |
| JP | 2003-531257 A | 10/2003 |
| JP | 2004-231905 A | 8/2004 |
| JP | 2009-91498 A | 4/2009 |
| JP | 2011-79913 A | 4/2011 |
| WO | WO 03/102053 A1 | 12/2003 |
| WO | WO 2010/131646 A1 | 11/2010 |

OTHER PUBLICATIONS

Chinese Office Action for corresponding Chinese Application No. 201180010745.0 dated May 10, 2013.
PCT/ISA/210—International Search Report mailed on May 31, 2011, issued is PCT/JP2011/053824.

* cited by examiner

*Primary Examiner* — Mark Eashoo
*Assistant Examiner* — Michael A Salvitti
(74) *Attorney, Agent, or Firm* — Birch, Stewart, Kolasch & Birch, LLP

(57) ABSTRACT

For a tire excellent in strength, low-heat buildup property, wet grip property, and driveability, and a rubber composition and a conjugated diene rubber for the tire, a conjugated diene rubber of the present invention includes 5 wt % or more of a structure that 3 or more conjugated diene polymer chains are bound via a denaturing agent, obtained by reaction of each chain and the agent, each chain being that at least one of terminals is an isoprene block having 70 wt % or more of an isoprene monomer unit, and the other is an active terminal, the agent having, per molecule, at least one of an epoxy group(s) and a hydrocarbyloxysilyl group(s), and being that a total number of the epoxy group(s) and hydrocarbyloxy groups in the hydrocarbyloxysilyl group(s) per molecule is 3 or more.

7 Claims, No Drawings

CONJUGATED DIENE RUBBER, RUBBER COMPOSITION, CROSSLINKED RUBBER, TIRE, AND PROCESS FOR PRODUCTION OF CONJUGATED DIENE RUBBER

TECHNICAL FIELD

The present invention relates to a conjugated diene rubber, a rubber composition, a cross-linked rubber product, a tire, and a method of producing a conjugated diene rubber. More specifically, the present invention relates to a conjugated diene rubber, a rubber composition containing the conjugated diene rubber, a cross-linked rubber product obtained by forming and cross-linking the rubber composition, a tire containing the cross-linked rubber product, and a method of producing the conjugated diene rubber.

BACKGROUND ART

In recent years, there has been strong demand for an automobile tire having a low fuel consumption property, in view of an environmental issue and a resource problem. Further, in view of safety, there has been demand for an automobile tire which is excellent in wet grip property, dry grip property, and driveability. A tire made from a rubber composition which contains silica as a filler is greater in low-heat buildup property than that of a tire made from a rubber composition containing generally-used carbon black. Accordingly, with the use of the rubber composition containing silica, it is possible to provide a tire having a lower fuel consumption property.

However, natural rubber and synthetic rubber having a low polarity, which is generally used as a material of a tire, is low in affinity for silica. For this reason, there has been known a technique of improving, by addition of various silane coupling agents, synthetic rubber or the like having a low polarity in affinity for silica. However, a rubber composition in which a silane coupling agent and silica are merely used together might be insufficient in abrasion resistance as compared with a rubber composition containing carbon black. Further, a silane coupling agent is expensive. For this reason, the greater a silane coupling agent content becomes, the higher a production cost becomes.

As a technique for solving these problems, there has been such a study that a specific denaturing agent is subjected to reaction so as to cause rubber itself to have affinity for silica. For example, Patent Literature 1 discloses such a conjugated diene rubber that a specific compound, having excellent affinity for silica, is reacted with an active terminal of a polymer. Further, Patent Literatures 2 and 3 disclose a rubber composition obtained in such a manner that (i) a conjugated diene rubber is obtained by causing a conjugated diene polymer having an active terminal to be reacted with polyorganosiloxane having a specific functional group, and (ii) silica is added to the conjugated diene rubber thus obtained. Furthermore, Patent Literature 4 discloses such a conjugated diene rubber that one of terminals of a molecular chain has an isoprene block and the other one of terminals of the molecular chain, which is an active terminal of a polymer, is reacted with specific tin halide compounds.

CITATION LIST

Patent Literature

[Patent Literature 1]
Japanese Patent Application Publication, Tokukai, No. 2003-171418 A

[Patent Literature 2]
Japanese Patent Application Publication, Tokukaihei, No. 09-110904 A (1997)

[Patent Literature 3]
Pamphlet of International Publication No. WO 2003/102053

[Patent Literature 4]
Japanese Translation of PCT International Publication, Tokuhyo, No. 2003-531257 A

SUMMARY OF INVENTION

Technical Problem

However, in recent years, there has been an increase in demand for higher performance of an automobile tire. In consideration of this, a tire is being newly developed should be further greater in low-heat buildup property and further higher in wet grip property, a driveability, etc., as compared with tires made of rubber compositions specifically described in the aforementioned Patent Literatures. A rubber composition which gives a tire having such properties is desired.

The present invention is made in view of the problems. An object of the present invention is to provide a conjugated diene rubber, from which a rubber composition is made, which rubber composition makes it possible to provide a tire which is excellent in strength, low-heat buildup property, wet grip property, driveability, etc.

Solution to Problem

The inventors of the present invention has found, as a result of diligent study in order to solve the problems, that it is possible to obtain, in the following manner, a conjugated diene rubber which is suitably used for a rubber composition which makes it possible to provide a tire that is excellent in strength, low-heat buildup property, wet grip property, and driveability. That is, the conjugated diene rubber can be obtained in such a manner not less than 3 conjugated diene polymer chains, in each of which one of terminals has an isoprene block and the other one of terminals is an active terminal, and a specific denaturing agent are reacted with each other so that the conjugated diene rubber contains, in an amount not less than a predetermined amount, such a structure that the not less than 3 conjugated diene polymer chains are bound to each other via the specific denaturing agent. Based on this finding, the present invention has been completed.

That is, a conjugated diene rubber of the present invention includes: such a structure that not less than 3 conjugated diene polymer chains are bound to each other via a denaturing agent, an amount of the structure in the conjugated diene rubber being not less than 5% by weight, the structure being obtained by causing the not less than 3 conjugated diene polymer chains and the denaturing agent to be reacted with each other, each of the not less than 3 conjugated diene polymer chains being such that at least one of terminals is an isoprene block having not less than 70% by weight of an isoprene monomer unit, and the other one of terminals is an active terminal, the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3.

Further, according to the present invention, a rubber composition includes: a rubber component in an amount of 100 parts by weight, the rubber component containing the conjugated diene rubber described above; and silica in an amount in a range of 10 parts by weight to 200 parts by weight.

Moreover, according to the present invention, a cross-linked rubber product is obtained by forming and cross-linking the rubber composition described above.

Further, according to the present invention, a tire is made of the cross-linked rubber product described above.

Furthermore, according to the present invention, a method of producing a conjugated diene rubber includes the steps of: obtaining such a conjugated diene polymer chain that at least one of terminals is an isoprene block having not less than 70% by weight of an isoprene monomer unit, and the other one of terminals is an active terminal, the conjugated diene polymer chain being obtained by (a) causing, by use of a polymerization initiator, an isoprene monomer or a monomer mixture containing an isoprene monomer to be subjected to living polymerization in an inert solvent, so as to form an isoprene block having an active terminal, then, (b) causing a conjugated diene monomer or a monomer mixture containing a conjugated diene monomer to be bound to the isoprene block, so that the conjugated diene monomer or the monomer mixture containing the conjugated diene monomer is subjected to the living polymerization again; and causing the active terminal of the conjugated diene polymer chain and a denaturing agent to be reacted with each other, the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3, the reacting being carried out so that a ratio of (i) a total number of mols of the one or more epoxy groups in the denaturing agent reacted with the active terminal of the conjugated diene polymer chain, and mols of the hydrocarbyloxy groups in the one or more hydrocarbyloxysilyl groups in the denaturing agent, to (ii) 1 mol of the polymerization initiator used in the living polymerization, is in a range of 0.1 to 5.

Advantageous Effects of Invention

A conjugated diene rubber of the present invention contains such a structure that not less than 3 specific conjugated diene polymer chains are bound to each other via a specific denaturing agent, and an amount of the structure in the conjugated diene rubber is not less than 5% by weight. For this reason, according to the present invention, it is possible to provide a conjugated diene rubber suitably used to provide a rubber composition which makes it possible to obtain a tire that is excellent in strength, low-heat buildup property, wet grip property, and driveability.

DESCRIPTION OF EMBODIMENTS

Conjugated diene rubber etc. of the present invention are described below. Note that, in the present specification, an expression "range of A to B" means a range of not less than a minimum value of "A" but not more than a maximum value of "B".

A conjugated diene rubber of the present invention contains such a structure that not less than 3 conjugated diene polymer chains are bound to each other via a specific denaturing agent, an amount of the structure in the conjugated diene rubber is not less than 5% by weight, the structure being obtained by causing the not less than 3 conjugated diene polymer chains and the specific denaturing agent to be reacted with each other, each of the not less than 3 conjugated diene polymer chains being such that at least one of terminals is an isoprene block having an isoprene monomer unit in an amount of not less than 70% by weight, and the other one of terminals is an active terminal.

[Conjugated Diene Polymer Chain]

A conjugated diene polymer chain used to form a structure contained in the conjugated diene rubber of the present invention is not particularly limited, as long as the conjugated diene polymer chain is a polymer chain containing a conjugated diene monomer unit, and is such that at least one of terminals is an isoprene block and the other one of terminals is an active terminal.

The conjugated diene polymer chain is obtained by (a) causing, by use of a polymerization initiator, an isoprene monomer or an isoprene monomer mixture containing an isoprene monomer in a predetermined amount to be subjected to living polymerization in an inert solvent, so as to form an isoprene block having an active terminal, then (b) causing a conjugated diene monomer or a monomer mixture containing a conjugated diene monomer to be bound to the isoprene block having the active terminal so that the conjugated diene monomer or the monomer mixture is subjected to living polymerization again. Note that it is preferable that the monomer mixture containing a conjugated diene monomer further contains an aromatic vinyl monomer.

(Isoprene Block)

In the present specification, the isoprene block is a part of a conjugated diene polymer chain, which part is mainly constituted by an isoprene monomer unit. Here, it is preferable that an amount of an isoprene monomer unit in the isoprene block is not less than 70% by weight, more preferably not less than 80% by weight, further more preferably not less than 90% by weight. It is particularly preferable that the isoprene block is made from only the isoprene monomer unit. In a case where (i) an amount of the isoprene monomer unit in the isoprene block is not less than 70% by weight, and (ii) silica is added to the conjugated diene rubber, the conjugated diene rubber has high affinity for silica. Accordingly, a tire made from the rubber composition becomes excellent in low-heat buildup property.

The conjugated diene polymer chain is such that, in at least one of terminals, which is not an active terminal, an isoprene block, having not less than 70% by weight of an isoprene monomer unit, is formed. It is possible that the conjugated diene polymer chain further has an isoprene block in a part other than the terminal. For example, it is possible to have an arrangement in which not only the terminal described above but also the terminal having an active terminal has an isoprene block. However, in view of productivity, it is preferable that the conjugated diene polymer chain has the arrangement in which an isoprene block is formed at only the terminal which is not the active terminal. In a case where (i) at least the terminal which is not the active terminal of the conjugated diene polymer chain is constituted by the isoprene block, and (ii) silica is added to the conjugated diene rubber, the conjugated diene rubber has high affinity for silica. Accordingly, a tire made from the rubber composition is excellent in low-heat buildup property.

A weight average molecular weight of the isoprene block (hereinafter, referred to as "isoprene block (A)" in some cases) existing at one of terminals of the conjugated diene polymer chain, which one of terminals is not an active terminal, is not particularly limited, and preferably in a range of 500 to 25,000, more preferably in a range of 1,000 to 5,500, further more preferably in a range of 1,500 to 4,000. In a case where the weight average molecular weight of the isoprene block (A) is not less than 500, an end product (i.e., a tire) becomes greater in strength. In a case where the weight average molecular weight of the isoprene block (A) is not more than 25,000, the end product (i.e., the tire) becomes greater in low-heat buildup property.

A molecular weight distribution, represented by a ratio (Mw/Mn) of a weight average molecular weight (Mw) of the isoprene block (A) and a number average molecular weight (Mn) of the isoprene block (A), is preferably in a range of 1.0 to 1.5, more preferably in a range of 1.0 to 1.4, further more preferably in a range of 1.0 to 1.3. In a case where a value (Mw/Mn) of the molecular weight distribution is in the aforementioned range, it becomes possible to produce the conjugated diene rubber of the present invention more easily.

Another monomer which is copolymerizable with an isoprene monomer used to obtain the isoprene block is not particularly limited, as long as the another monomer is copolymerizable with the isoprene monomer. For example, the another monomer may be 1,3-butadiene, styrene, or α-methylstyrene. Among these, it is preferable to use styrene as the another monomer. An amount of the another monomer in the isoprene block is not more than 30% by weight, preferably not more than 20% by weight, more preferably not more than 10% by weight. It is particularly preferable that the isoprene block is made from only the isoprene monomer unit.

An inert solvent used in polymerization of the isoprene monomer (mixture) is not particularly limited, as long as the inert solvent is the one which is generally used in solution polymerization, and does not inhibit polymerization reaction. Specific examples of the inert solvent encompass (i) acyclic aliphatic hydrocarbon such as butane, pentane, hexane, heptane, and 2-butene, (ii) alicyclic hydrocarbon such as cyclopentane, cyclohexane, and cyclohexene, and (iii) aromatic hydrocarbon such as benzene, toluene, and xylene. A used amount of the inert solvent is such that a concentration of a monomer is generally in a range of 1% by weight to 50% by weight, preferably in a range of 10% by weight to 40% by weight.

A polymerization initiator used in preparation of the isoprene block is not particularly limited, as long as the polymerization initiator can cause the isoprene monomer (mixture) to be subjected to living polymerization so that a polymer chain having an active terminal is provided. Preferable examples of the polymerization initiator encompass an organic alkali metal compound is a main catalyst, an organic alkali earth metal compound is a main catalyst, and a polymerization initiator in which a lanthanum metal compound is a main catalyst. Specific examples of the organic alkali metal compound encompass (i) an organic monolithium compound such as n-butyllithium, sec-butyllithium, t-butyllithium, hexyllithium, phenyllithium, and stilbenelithium, (ii) an organic multivalent lithium compound such as dilithiomethane, 1,4-dilithiobutane, 1,4-dilithio-2-ethylcyclohexane, 1,3,5-trilithiobenzene, and 1,3,5-tris (lithiomethyl) benzene, (iii) an organic sodium compound such as sodium naphthalene, and (iv) an organic potassium compound such as potassium naphthalene. Further, examples of the organic alkali earth metal compound encompass di-n-butyl magnesium, di-n-hexyl magnesium, diethoxy calcium, calcium distearate, di-t-butoxy strontium, diethoxy barium, diisopropoxy barium, diethyl mercapto barium, di-t-butoxy barium, diphenoxy barium, diethylamino barium, barium distearate, and diketyl barium. Examples of the polymerization initiator in which a lanthanum metal compound is a main catalyst encompass a polymerization initiator that contains (i), as a main catalyst, salt of a lanthanum metal, made from a lanthanum metal such as lanthanum, cerium, praceodymium, neodymium, samarium, and gadolinium and carboxylic acid, phosphorous organic acid, or the like, and (ii), as a sub catalyst, an alkyl aluminum compound, an organic aluminum hydride compound, and an organic aluminum halide compound. Among these polymerization initiators, it is preferable to employ an organic monolithium compound or an organic multivalent lithium compound, more preferably an organic monolithium compound, further more preferably n-butyllithium. Note that the organic alkali metal compound may be reacted with, in advance, a secondary amine such as dibutyl amine, dihexyl amine, dibenzyl amine, pyrrolidine, hexamethylene imine, and heptamethylene imine (preferably pyrrolidine, hexamethylene imine, and heptamethylene imine), so as to be used as an organic alkali metal amide compound. It is possible to employ, as the polymerization initiator, one of these polymerization initiators solely. Alternatively, it is possible to employ, as the polymerization initiator, a combination of at least two of these polymerization initiators.

A used amount of the polymerization initiator can be determined in accordance with a target molecular weight. However, it is preferable that a used amount of the polymerization initiator is, per 100 g of the isoprene monomer (mixture), in a range of 4 mmol to 250 mmol, more preferably in a range of 30 mmol to 200 mmol, further more preferably, in a range of 40 mmol to 100 mmol.

When the isoprene monomer (mixture) is subjected to polymerization, a polymerization temperature is generally in a range of −80° C. to +150° C., preferably in a range of 0° C. to 100° C., more preferably in a range of 20° C. to 90° C.

In order to adjust a vinyl bond content in the isoprene monomer unit of the isoprene block, it is preferable to add a polar compound to an inert organic solvent in the polymerization. Examples of the polar compound encompass an ether compound such as dibutyl ether, tetrahydrofuran, and 2,2-di (tetrahydrofuryl) propane, a tertiary amine such as tetramethyl ethylene diamine, alkali metal alkoxide, and a phosphine compound. Among these, it is preferable to employ an ether compound or a tertiary amine, more preferably, among these, the one which can form a chelated structure with a metal of the polymerization initiator. It is further more preferable to employ 2,2-di (tetrahydrofuryl) propane or tetramethyl ethylene diamine. A used amount of the polar compound can be determined in accordance with a target vinyl bond content, and is preferably adjusted to be, per 1 mol of the polymerization initiator, in a range of 0.1 mol to 30 mol, more preferably in a range of 0.5 mol to 10 mol. In a case where a used amount of the polar compound is in the aforementioned range, it is easy to adjust a vinyl bond content in the isoprene monomer unit. Further, with the use of the polar compound in the aforementioned range, there is not likely to be a defect due to deactivation of the polymerization initiator.

A vinyl bond content in the isoprene monomer unit of the isoprene block (A) is preferably in a range of 21% by weight to 85% by weight, more preferably in a range of 50% by weight to 80% by weight. In a case where a vinyl bond content in the isoprene monomer unit of the isoprene block (A) is in the aforementioned range, an end product (i.e., a tire) becomes greater in low-heat buildup property and wet grip property. Note that, in the present specification, the "vinyl bond content" in the isoprene monomer unit means a proportion of a total amount of an isoprene monomer that has a 1,2-structure and an isoprene monomer that has a 3,4-structure, in the isoprene monomer unit. Particularly, In a case where a vinyl bond content in the isoprene monomer unit of the isoprene block (A) is in a range of 50% by weight to 80% by weight, a tire to be obtained would become particularly excellent in wet grip property.

As to the isoprene block existing in a part other than one of the terminals of the conjugated diene polymer chain, which one of the terminals is not an active terminal, a weight average molecular weight, a molecular weight distribution, and a vinyl bond content in the isoprene monomer unit are not particularly limited.

(Parts Other than Isoprene Block)

It is preferable that a part other than the isoprene block in the conjugated diene polymer chain is a homopolymer chain of a conjugated diene monomer or a copolymer chain of a conjugated diene monomer and an aromatic vinyl monomer. It is preferable that a weight ratio of a conjugated diene monomer unit to an aromatic vinyl monomer unit (the conjugated diene monomer unit: the aromatic vinyl monomer unit) is in a range of 100:0 to 50:50, more preferably, in a range of 90:10 to 60:40, further more preferably, in a range of 85:15 to 70:30. In a case where the weight ratio of the conjugated diene monomer unit to the aromatic vinyl monomer unit is in the aforementioned range, it becomes possible to produce the conjugated diene rubber of the present invention more easily.

Examples of the conjugated diene monomer, contained in the monomer (mixture) used to obtain the part other than the isoprene block in the conjugated diene polymer chain, encompass 1,3-butadiene, isoprene (2-methyl-1,3-butadiene), 2,3-dimethyl-1,3-butadiene, 2-chloro-1,3-butadiene, 1,3-pentadiene, and 1,3-hexadiene. Among these, it is preferable to employ 1,3-butadiene or isoprene, more preferably, 1,3-butadiene. It is possible to employ one of these solely, as the conjugated diene monomer. Alternatively, it is possible to employ, as the conjugated diene monomer, a combination of at least two of these. In a case where isoprene is employed as the conjugated diene monomer, it is preferable that an isoprene monomer unit content in the part other than the isoprene block is less than 70% by weight so that the part becomes different from the isoprene block.

Further, the aromatic vinyl monomer, contained in the monomer (mixture) used to obtain the conjugated diene polymer chain, is not particularly limited. Examples of the aromatic vinyl monomer encompass styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, and dimethylaminoethylstyrene. Among these, it is preferable to employ styrene, α-methylstyrene, or 4-methylstyrene, more preferably styrene. It is possible to employ one of these solely, as the aromatic vinyl monomer. Alternatively, it is possible to employ, as the aromatic vinyl monomer, a combination of at least two of these.

It is possible to add, if necessary, to the monomer (mixture), another monomer other than the conjugated diene monomer and the aromatic vinyl monomer, in such an amount that the monomer (mixture) does not lose an essential characteristic of the present invention. Examples of the another monomer encompass (i) α,β-unsaturated nitrile such as acrylonitrile and methacrylonitrile, (ii) unsaturated carboxylic acid or acid anhydride such as acrylic acid, methacrylic acid, and maleic anhydride, (iii) unsaturated carboxylic acid ester such as methyl methacrylate, ethyl acrylate, and butyl acrylate, and (iv) nonconjugated diene such as 1,5-hexadiene, 1,6-heptadiene, 1,7-octadiene, dicyclopentadiene, and 5-ethylidene-2-norbornene. It is preferable that a used amount of these monomers is, in the monomer (mixture), not more than 10% by weight, more preferably, not more than 5% by weight.

As to an inert solvent used in the polymerization of the monomer (mixture), examples are the same as those of the inert solvent used in the preparation of the isoprene block.

A polymerization initiator of the monomer (mixture) may be the isoprene block itself, having the active terminal described above (hereinafter, merely referred to as "Isoprenyl-M", in some cases). A used amount of the polymerization initiator can be determined in accordance with a target molecular weight. However, a used amount of the polymerization initiator is generally, per 100 g of the monomer (mixture), in a range of 0.1 mmol to 5 mmol, preferably in a range of 0.2 mmol to 2 mmol, more preferably in a range of 0.3 mmol to 1.5 mmol.

A polymerization temperature in the polymerization of the monomer (mixture) is generally in a range of −80° C. to +150° C., preferably in a range of 0° C. to 100° C., more preferably in a range of 20° C. to 90° C. Any types of method, such as a batch-type method and a continuous type method, can be used as a method for carrying out the polymerization. In a case where the part other than the isoprene block in the conjugated diene polymer chain is a copolymer chain of a conjugated diene monomer and an aromatic vinyl monomer, or a copolymer chain made of at least two sorts of conjugated diene monomer, it is preferable to employ a batch-type method in view of easiness in control of a random property of the binding.

In a case where the part other than the isoprene block in the conjugated diene polymer chain is a copolymer chain of a conjugated diene monomer and an aromatic vinyl monomer, or a copolymer chain made from at least two sorts of conjugated diene monomer, examples of a binding type of each monomer encompass various types. For example, the binding type of each monomer may be a block type, a tapered type, or a random type. Among these, it is preferable to employ the random type. In order to cause the conjugated diene monomer and the aromatic vinyl monomer to have a random binding type, it is preferable that the conjugated diene monomer or a combination of the conjugated diene monomer and the aromatic vinyl monomer are continuously or intermittently provided in a polymerization system for the polymerization, so that a ratio of an amount of the aromatic vinyl monomer to a total amount of the conjugated diene monomer and the aromatic vinyl monomer would not become too high.

In order to adjust a vinyl bond content in the conjugated diene monomer unit in the part other than the isoprene block in the conjugated diene polymer chain, it is preferable to add, in the polymerization, a polar compound to an inert organic solvent, in the same manner as the adjustment of a vinyl bond content in the isoprene monomer unit of the isoprene block. However, in a case where, in the preparation of the isoprene block, a sufficient amount of the polar compound has been added to the inert organic solvent to adjust a vinyl bond content in the conjugated diene monomer unit in the part other than the isoprene block in the conjugated diene polymer chain, it is unnecessary to further add the polar compound. Specific examples of the polar compound used to adjust a vinyl bond content are the same as those of the polar compound used in the preparation of the isoprene block, described above. A used amount of the polar compound can be determined in accordance with a target vinyl bond content, and is preferably adjusted to be, per 1 mol of the polymerization initiator, in a range of 0.01 mol to 100 mol, more preferably in a range of 0.1 mol to 30 mol. In a case where a used amount of the polar compound is in the aforementioned range, it is easy to adjust a vinyl bond content in the conjugated diene monomer unit and a defect due to deactivation of the polymer initiator is not likely to occur.

A vinyl bond content in the conjugated diene monomer unit in the part other than the isoprene block in the conjugated diene polymer chain is preferably in a range of 10% by weight to 90% by weight, more preferably in a range of 30% by weight to 80% by weight, further more preferably in a range of 40% by weight to 70% by weight. In a case where a vinyl bond content in the conjugated diene monomer unit in the part other than the isoprene block in the conjugated diene polymer chain is in the aforementioned range, an end product (i.e., a tire) to be obtained becomes greater in low-heat buildup property.

(Conjugated Diene Polymer Chain)

The conjugated diene polymer chain (hereinafter, merely referred to as conjugated diene polymer chain (B) in some cases) used to obtain the conjugated diene rubber of the present invention is such that at least one of terminals is an isoprene block and the other one of terminals is an active terminal. A weight average molecular weight of the conjugated diene polymer chain (B) is not particularly limited, and is preferably in a range of 1,000 to 2,000,000, more preferably in a range of 10,000 to 1,500,000, further more preferably in a range of 100,000 to 1,000,000. In a case where a weight average molecular weight of the conjugated diene polymer chain (B) is in the aforementioned range, it becomes possible to cause a tire made from the conjugated diene polymer chain (B) to be excellent in balance between a strength of the tire and a low-heat buildup property of the tire.

A molecular weight distribution represented by a ratio (Mw/Mn) of a weight average molecular weight (Mw) of the conjugated diene polymer chain (B) to a number average molecular weight of the conjugated diene polymer chain (B) is preferably in a range of 1.0 to 3.0, more preferably in a range of 1.0 to 2.5, further more preferably in a range of 1.0 to 2.2. In a case where a value of a molecular weight distribution (Mw/Mn) is in the aforementioned range, it becomes easy to produce the conjugated diene rubber of the present invention.

As described above, the conjugated diene polymer chain (B) can be obtained by (a) causing, by use of a polymerization initiator, an isoprene monomer (mixture) to be subjected to living polymerization in an inert solvent, so as to form an isoprene block (Isoprenyl-M) having an active terminal, then (b) causing, by use of Isoprenyl-M as another polymerization initiator, a monomer (mixture) to be subjected to living polymerization. Here, it is possible that isoprenyl-M is added to a solution of the monomer (mixture), or the monomer (mixture) is added to a solution of Isoprenyl-M. It is preferable to add Isoprenyl-M to a solution of the monomer (mixture). Further, by further adding an isoprene monomer (mixture) to the polymerization system when a polymerization conversion of the monomer (mixture) generally reaches not less than 95%, it is possible to form an isoprene block at the active terminal of the conjugated diene polymer chain (B) as well. A used amount of the isoprene monomer (mixture) is preferably, per 1 mol of the polymerization initiator used in the first polymerization reaction, in a range of 10 mol to 100 mol, more preferably in a range of 15 mol to 70 mol, further more preferably in a range of 20 mol to 35 mol.

It is possible that the conjugated diene polymer chain (B) does not contain an aromatic vinyl monomer unit. However, it is preferable that the conjugated diene polymer chain (B) contains an aromatic vinyl monomer unit. A preferable range of a weight ratio (the conjugated diene monomer unit:the aromatic vinyl monomer unit) of the conjugated diene monomer unit in the conjugated diene polymer chain (B) to the aromatic vinyl monomer unit in the conjugated diene polymer chain (B) is the same as that of the part other than the isoprene block described above. Further, a preferable range of a vinyl bond content in the conjugated diene monomer unit in the conjugated diene polymer chain (B) is the same as that of the part other than the isoprene block described above.

[Denaturing Agent]

The conjugated diene rubber of the present invention is obtained in such a manner that an active terminal of the conjugated diene polymer chain (B) thus obtained and a denaturing agent are reacted with each other, which denaturing agent (i) has, per molecule, at least one of (1) one or more epoxy groups and (2) one or more hydrocarbyloxysilyl groups, and (ii) is such that a total number of the number of the one or more epoxy groups per molecule and the number of hydrocarbyloxy groups contained in the one or more hydrocarbyloxysilyl groups per molecule is not less than 3.

In the present specification, the "denaturing agent" is a compound having, per molecule, a functional group which reacts with an active terminal of a conjugated diene polymer chain. Note, however, that the functional group is limited to the one having affinity for silica. According to the present invention, the functional group is an epoxy group and/or a hydrocarbyloxy group contained in a hydrocarbyloxysilyl group.

The denaturing agent (hereinafter, referred to as "denaturing agent (C)" in some cases), used to form a structure contained in the conjugated diene rubber of the present invention, is not particularly limited, as long as the denaturing agent (i) has, per molecule, at least one of (1) one or more epoxy groups and (2) one or more hydrocarbyloxysilyl groups, and (ii) is such that a total number of the number the one or more epoxy groups per molecule and hydrocarbyloxy groups contained in the one or more hydrocarbyloxysilyl groups per molecule is not less than 3. That is, the denaturing agent (C) may have, per molecule, not less than 3 epoxy groups or have a hydrocarbyloxysilyl group(s), in which, per molecule, not less than 3 hydrocarbyloxy groups are bound to a silicon atom. Further, the denaturing agent (C) may have, per molecule, both an epoxy group(s) and a hydrocarbyloxysilyl(s). In this case, a total number of the number of epoxy groups per molecule and the number of hydrocarbyloxy groups, per molecule, bound to a silicon atom in the hydrocarbyloxysilyl group(s), is not less than 3. Note that, in a case where the denaturing agent (C) contains a hydrocarbyloxysilyl group(s) per molecule, and the number of hydrocarbyloxy groups, per molecule, bound to a silicon atom in the hydrocarbyloxysilyl group(s), is not less than 2, the denaturing agent (C) is one of the following three cases: (i) the denaturing agent contains, per molecule, not less than 2 silicon atoms having a hydrocarbyloxy group; (ii) the denaturing agent contains, per molecule, in the hydrocarbyloxysilyl group, a silicon atom having at least 2 hydrocarbyloxy groups; and (iii) a combination of the above (i) and (ii). Note that, there is a case where an organic group other than the hydrocarbyloxy group is bound to a silicon atom of a hydrocarbyloxysilyl group. In this case, the organic group is not particularly limited.

In a case where the conjugated diene polymer chain (B) is reacted with the denaturing agent (C) containing an epoxy group(s), it is considered that (i) at least a part of the epoxy group(s) in the denaturing agent (C) is subjected to ring-opening, and, as a result, (ii) a carbon atom of the part subjected to the ring-opening and the active terminal of the conjugated diene polymer chain (B) are bound to each other. Further, in a case where the conjugated diene polymer chain (B) is reacted with the denaturing agent (C) containing a hydrocarbyloxysilyl group(s), it is considered that (i) at least a part of a hydrocarbyloxy group(s) in the hydrocarbyloxysilyl group(s) of the denaturing agent (C) is subjected to desorption, and, as a result, (ii) a silicon atom contained in the denaturing agent (C) and the active terminal of the conjugated diene polymer chain (B) are bound to each other.

With the use of the denaturing agent (C) in which a total number of the number of epoxy groups per molecule and the number of hydrocarbyloxy groups in a hydrocarbyloxysilyl group(s) per molecule is not less than 3, it is possible to obtain a conjugated diene rubber having such a structure that not less than 3 conjugated diene polymer chains (B) described above are bound to each other via the denaturing agent (C). As a result, a tire made from a rubber composition containing the conjugated diene rubber becomes excellent in strength, low-heat buildup property, wet grip property, and driveability.

Examples of the hydrocarbyloxysilyl group contained in the denaturing agent (C) encompass (i) an alkoxysilyl group such as a methoxysilyl group, an ethoxysilyl group, a propoxysilyl group, and a butoxysilyl group, and (ii) aryloxysilyl group such as a phenoxysilyl group. Among these, it is preferable to employ an alokoxysilyl group, more preferably, an ethoxysilyl group.

Further, examples of the hydrocarbyloxy group in the hydrocarbyloxysilyl group contained in the denaturing agent (C) encompass an alkoxy group such as a methoxy group, an ethoxy group, a propoxy group, and a butoxy group, and an aryloxy group such as a phenoxy group. Among these, it is preferable to employ an alkoxy group, more preferably an ethoxy group.

Particularly preferable examples of the denaturing agent (C) encompass polyorganosiloxane represented by the following general formula (I), polyorganosiloxane represented by the following general formula (II), polyorganosiloxane represented by the following general formula (III), and hydrocarbyloxysilane represented by the following general formula (IV). Among these, in order to obtain a tire which is greater in strength, low-heat buildup property, wet grip property, and driveability, it is preferable to employ polyorganosiloxane, more preferably, polyorganosiloxane represented by the following general formula (I).

[Chemical Formula 1]

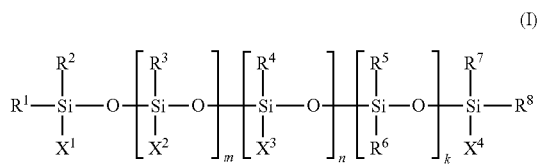

(I)

(wherein: $R^1$-$R^8$ are independently a $C_1$-$C_6$ alkyl group or a $C_6$-$C_{12}$ aryl group, and are either identical with each other or different from each other; $X^1$ and $X^4$ are independently a $C_1$-$C_5$ alkoxy group, a $C_6$-$C_{14}$ aryloxy group, a $C_4$-$C_{12}$ group having an epoxy group, a $C_1$-$C_6$ alkyl group, or a $C_6$-$C_{12}$ aryl group, and are either identical with each other or different from each other; $X^2$ is a $C_1$-$C_5$ alkoxy group, a $C_6$-$C_{14}$ aryloxy group, or a $C_4$-$C_{12}$ group having an epoxy group; $X^3$ is a group containing repeating units of alkylene glycol, the number of repeating units being in a range of 2 to 20; m is an integer in a range of 3 to 200; n is an integer in a range of 0 to 200; and k is an integer in a range of 0 to 200).

[Chemical Formula 2]

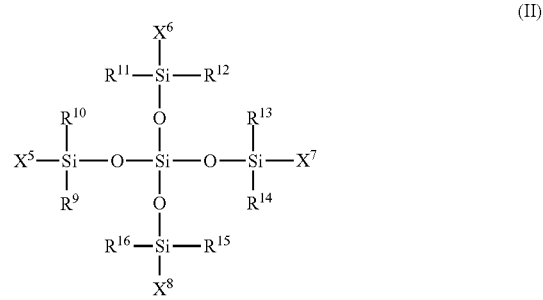

(II)

(wherein: $R^9$-$R^{16}$ are independently a $C_1$-$C_6$ alkyl group, or a $C_6$-$C_{12}$ aryl group, and are either identical with each other or different from each other; and $X^5$-$X^8$ are independently a $C_1$-$C_5$ alkoxy group, a $C_6$-$C_{14}$ aryloxy group, or a $C_4$-$C_{12}$ group having an epoxy group).

[Chemical Formula 3]

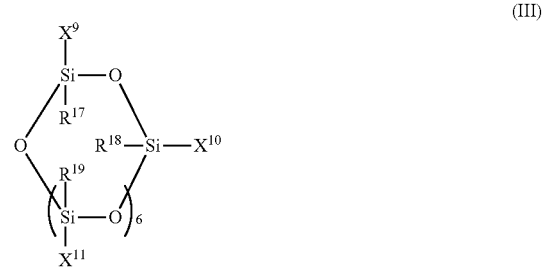

(III)

(wherein: $R^{17}$-$R^{19}$ are independently a $C_1$-$C_6$ alkyl group or a $C_6$-$C_{12}$ aryl group, and are either identical with each other or different from each other; $X^9$-$X^{11}$ are independently a $C_1$-$C_5$ alkoxy group, a $C_6$-$C_{14}$ aryloxy group, or a $C_4$-$C_{12}$ group having an epoxy group; and s is an integer in a range of 1 to 18).

[Chemical Formula 4]

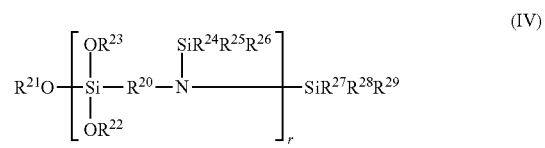

(IV)

(wherein: $R^{20}$ is a $C_1$-$C_{12}$ alkylene group; $R^{21}$-$R^{29}$ are independently a $C_1$-$C_6$ alkyl group or a $C_6$-$C_{12}$ aryl group, and are either identical with each other or different from each other; and r is an integer in a range of 1 to 10).

As to polyorganosiloxane represented by the general formula (I), examples of the $C_1$-$C_6$ alkyl group which can constitute $R^1$-$R^8$, $X^1$, and $X^4$ in the general formula (I) encompass a methyl group, an ethyl group, an n-propyl group, an isopropyl group, a butyl group, a pentyl group, a hexyl group, and cyclohexyl group. Examples of the $C_6$-$C_{12}$ aryl group encompass a phenyl group, and a methylphenyl group. Among these, in view of production of polyorganosiloxane itself, it is preferable to employ a methyl group or an ethyl group.

As to polyorganosiloxane represented by the general formula (I), examples of the $C_1$-$C_5$ alkoxy group which can constitute $X^1$, $X^2$, and $X^4$ encompass a methoxy group, an ethoxy group, a propoxy group, an isopropoxy group, and a butoxy group. Among these, in view of reactivity with respect to the active terminal of the conjugated diene polymer chain (B), it is preferable to employ a methoxy group or an ethoxy group.

As to polyorganosiloxane represented by the general formula (I), examples of the $C_6$-$C_{14}$ aryloxy group which can constitute $X^1$, $X^2$, and $X^4$ encompass a phenoxy group and a tolyloxy group.

Further, as to polyorganosiloxane represented by the general formula (I), examples of the $C_4$-$C_{12}$ group having an epoxy group, which can constitute $X^1$, $X^2$, and $X^4$, encompass a group represented by the following general formula (V).

(wherein: $Z^1$ is a $C_1$-$C_{10}$ alkylene group or an alkylarylene group; $Z^2$ is a methylene group, a sulfur atom, or an oxygen atom; and E is a $C_2$-$C_{10}$ hydrocarbyl group having an epoxy group).

The group represented by the general formula (V) is preferably such that $Z^2$ is an oxygen atom, more preferably such that $Z^2$ is an oxygen atom, and E is a glycidyl group, further more preferably such that $Z^1$ is a $C_3$ alkylene group, $Z^2$ is an oxygen atom, and E is a glycidyl group.

As to polyorganosiloxane represented by the general formula (I), it is preferable that $X^1$ and $X^4$ are independently the $C_4$-$C_{12}$ group having an epoxy group or the $C_1$-$C_6$ alkyl group, among the examples described above. Further, it is preferable that $X^2$ is the $C_4$-$C_{12}$ group having an epoxy group, among the examples described above. Furthermore, as to polyorganosiloxane represented by the general formula (I), it is more preferable that $X^1$ and $X^4$ are independently the $C_1$-$C_6$ alkyl group and $X^2$ is the $C_4$-$C_{12}$ group having an epoxy group.

As to polyorganosiloxane represented by the general formula (I), it is preferable that the group having repeating units of alkyleneglycol, the number of repeating units being in a range of 2 to 20, i.e., $X^3$, is a group represented by the following general formula (VI).

[Chemical Formula 5]

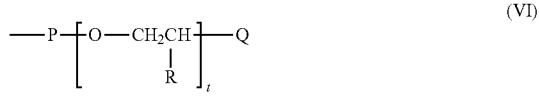

(wherein: t is an integer in a range of 2 to 20; P is a $C_2$-$C_{10}$ alkylene group or an alkylarylene group; R is a hydrogen atom or a methyl group; and Q is a $C_1$-$C_{10}$ alkoxy group or an aryloxy group). Among these, $X^3$ is preferably such that t is an integer in a range of 2 to 8, P is a $C_3$ alkylene group, R is a hydrogen atom, and Q is a methoxy group.

As to polyorganosiloxane represented by the general formula (I), m is an integer in a range of 3 to 200, preferably in a range of 20 to 150, more preferably in a range of 30 to 120. In a case where m is not less than 3, (i) a rubber composition containing a conjugated diene rubber, obtained by causing the denaturing agent (C) and the conjugated diene polymer chain (B) to be reacted with each other, becomes greater in processability, and (ii) a tire made from the conjugated diene rubber becomes greater in low-heat buildup property. Further, in a case where m is not more than 200, (i) it becomes easy to produce polyorganosiloxane itself. In addition, in this case, a viscosity of polyorganosiloxane would not become too high, so that it becomes possible to handle polyorganosiloxane more easily.

Moreover, as to polyorganosiloxane represented by the general formula (I), n is an integer in a range of 0 to 200, preferably in a range of 0 to 150, more preferably in a range of 0 to 120. Further, k is an integer in a range of 0 to 200, preferably in a range of 0 to 150, more preferably in a range of 0 to 120. It is preferable that a total number of m, n, and k is not more than 400, more preferably not more than 300, further more preferably not more than 250. In a case where the total number of m, n, and k is not more than 400, (i) it becomes easy to produce polyorganosiloxane itself. In addition, in this case, a viscosity of polyorganosiloxane would not become too high, so that it becomes easy to handle polyorganosiloxane.

As to polyorganosiloxane represented by either the general formula (II) or the general formula (III), a $C_1$-$C_6$ alkyl group, a $C_6$-$C_{12}$ aryl group, a $C_1$-$C_5$ alkoxy group, a $C_6$-$C_{14}$ aryloxy group, and a $C_4$-$C_{12}$ group having an epoxy group are the same as those of polyorganosiloxane represented by the general formula (I), described above.

As to hydrocarbyloxysilane represented by the general formula (IV), a $C_1$-$C_6$ alkyl group and a $C_6$-$C_{12}$ aryl group are the same as those of polyorganosiloxane represented by the general formula (I), described above.

As to hydrocarbyloxysilane represented by the general formula (IV), examples of the $C_1$-$C_{12}$ alkylene group encompass a methylene group, an ethylene group, and a propylene group. Among these, it is preferable to employ a propylene group.

Specific examples of hydrocarbyloxyxilane represented by the general formula (IV) encompass N,N-bis (trimethylsilyl)-3-aminopropyltrimethoxysilane, N,N-bis (trimethylsilyl)-3-aminopropyltriethoxysilane, N,N-bis (trimethylsilyl)aminoethyltrimethoxysilane, and N,N-bis (trimethylsilyl)aminoethyltriethoxysilane. Among these, it is preferable to employ N,N-bis (trimethylsilyl)-3-aminopropyltrimethoxysilane, or N,N-bis (trimethylsilyl)-3-aminopropyltriethoxysilane.

Other examples of the denaturing agent (C) encompass a tetraalkoxysilane compound such as tetramethoxysilane, a hexaalkoxysilane compound such as bis(trimethoxysilyl)methane, an alkylalkoxysilane compound such as methyltriethoxysilane, an alkenylalkoxysilane compound such as vinyltrimethoxysilane, an arylalkoxysilane compound such as phenyltrimethoxysilane, a halogenoalkoxysilane compound such as triethoxychlorosilane, an alkoxysilane compound containing an epoxy group such as 3-glycidoxyethyltrimethoxysilane, 3-glycidoxybutylpropyltrimethoxysilane, and bis (3-glycidoxypropyl) dimethoxysilane, an alkoxysilane compound containing sulfur such as bis(3-(triethoxysilyl) propyl)disulfide, an alkoxysilane compound containing an amino group such as bis(3-trimethoxysilylpropyl) methylamine, an alkoxysilane compound containing an isocyanate group such as tris (3-trimethoxysilylpropyl) isocyanurate, and a compound containing an epoxy group such as tetraglycidyl-1,3-bisaminomethylcyclohexane.

It is possible to employ, as the denaturing agent (C), one of these compounds solely. Alternatively, it is possible to employ, as the denaturing agent (C), a combination of at least two of these compounds.

A used amount of the denaturing agent (C) is not particularly limited. However, a ratio of a total amount (mol) of the denaturing agent (C) to 1 mol of the polymerization initiator used in the polymerization reaction is generally in a range of 0.1 to 5, preferably in a range of 0.5 to 3, which total amount (mol) is a sum of (i) an epoxy group contained in the denaturing agent (C) which reacts with the active terminal of the conjugated diene polymer chain (B), and (ii) a hydrocarbyloxy group in the hydrocarbyloxysilyl group contained in the denaturing agent (C) which reacts with the active terminal of the conjugated diene polymer chain (B). In a case where a used amount of the denaturing agent (C) is in the aforementioned range, (i) a rubber composition containing the conjugated diene rubber obtained by causing the denaturing agent (C) and the conjugated diene polymer chain (B) to be reacted with each other becomes greater in processability, and (ii) a tire made from the conjugated diene rubber becomes grater in low-heat buildup property.

It is possible to deactivate a part of the active terminal of the conjugated diene polymer chain (B) before the conjugated diene polymer chain (B) is reacted with the denaturing agent (C). In this case, a polymerization terminator, a polymerization terminal denaturing agent other than the denaturing agent (C), a coupling agent, and/or the like, are added into the polymerization system. Note, however, that an amount of such an agent added to the polymerization system is in such a range that an effect of the present invention is not inhibited.

Examples of the polymerization terminal denaturing agent and the coupling agent used in the case described above encompass (i) N-substituent cyclic amide such as N-methyl-2-pyrrolidone, N-vinyl-2-pyrrolidone, N-phenyl-2-pyrrolidone, and N-methyl-ε-caprolactam, (ii) N-substituent cyclic urea such as 1,3-dimethylethylene urea and 1,3-diethyl-2-imidazolidinone, (iii) N-substituent aminoketone such as 4,4'-bis(dimethylamino) benzophenone and 4,4'-bis(diethylamino) benzophenone, (iv) aromatic isocyanate such as diphenylmethane diisocyanate and 2,4-tolylene diisocyanate, (v) N,N-di-substituent aminoalkylmethacrylamide such as N,N-dimethylaminopropylmethacrylamide, (vi) N-substituent aminoaldehyde such as 4-N,N-dimethylaminobenzaldehyde, (vii) N-substituent carbodiimide such as dicyclohexylcarbodiimide, Schiff's base such as N-ethylethylideneimine and N-methylbenzylideneimine, (viii) a vinyl compound containing a pyridyl group such as 4-vinylpyridine, and (ix) a halide metal compound such as tin tetrachloride, silicon tetrachloride, hexachlorodisilane, bis (trichlorosilyl) methane, 1,2-bis(trichlorosilyl)ethane, 1,3-bis(trichlorosilyl) propane, 1,4-bis(trichlorosilyl) butane, 1,5-bis(trichlorosilyl) pentane, and 1,6-bis (trichlorosilyl) hexane. Among these, it is preferable that the conjugated diene rubber of the present invention is obtained by using a halide metal compound as a coupling agent, more preferably by using, as the coupling agent, a halide silicon compound having, per molecule, not less than 5 silicon-halogen atomic bonds, more preferably by using, as the coupling agent, 1,6-bis(trichlorosilyl) hexane. A tire made from a hyperbranched conjugated diene rubber obtained by using, as a coupling agent, a halide silicon compound having, per molecule, not less than 5-silicon-halogen atomic bonds, has a further improvement in driveability.

A used amount of the coupling agent is not particularly limited, as long as the amount is in such a range that an effect of the present invention is not inhibited. For example, in a case where the halide silicon compound having, per molecule, not less than 5 silicon-halogen atomic bonds, is employed, a used amount of the halide silicon compound is preferably such that a ratio of the number of mols of the silicon-halogen atomic bonds of the halide silicon compound to 1 mol of the polymerization initiator used in the polymerization reaction is in a range of 0.001 to 0.25, more preferably in a range of 0.01 to 0.2. In a case where a used amount of the coupling agent is in the aforementioned range, (i) a rubber composition containing a conjugated diene rubber obtained by causing the coupling agent and the conjugated diene polymer chain (B) to be reacted with each other becomes greater in processability, and (ii) a tire made from the conjugated diene rubber becomes greater in low-heat buildup property.

It is possible to employ one of these agents described above solely, as the coupling agent. Alternatively, it is possible to employ, as the coupling agent, a combination of at least two of these agents.

In view of successful control of the reaction, it is preferable that, in a case where the denaturing agent (C) and the coupling agent etc. are added to a solution containing the conjugated diene polymer chain (B), the denaturing agent (C) and the coupling agent etc. are dissolved in an inert solvent, and then are added into the polymerization system. In this case, it is preferable that a concentration of the solution is in a range of 1% by weight to 50% by weight.

[Conjugated Diene Rubber]

The conjugated diene rubber of the present invention is obtained by causing the conjugated diene polymer chain (B) and the denaturing agent (C) to be reacted with each other. Specifically, the conjugated diene rubber has a structure in an amount of not less than 5% by weight, which structure is such that not less than 3 conjugated diene polymer chains (B) are bound to each other via the denaturing agent (C).

The reaction between the conjugated diene polymer chain (B) and the denaturing agent (C) can be carried out, for example, by adding the denaturing agent (C) to a solution containing the conjugated diene polymer chain (B). Timing of the addition of the denaturing agent (C), the coupling agent, etc. is not particularly limited. However, the denaturing agent (C), the coupling agent, etc. are preferably added to a solution in which (i) the polymerization reaction of the conjugated diene polymer chain (B) is not completed, and therefore (ii) a monomer still exists, more specifically, the solution which contains the conjugated diene polymer chain (B) and in which an amount of a monomer is preferably not less than 100 ppm, more preferably in a range of 300 ppm to 50,000 ppm. By carrying out the addition of the denaturing agent (C), the coupling agent, etc. in the manner described above, it becomes possible to (i) suppress side reaction between the conjugated diene polymer chain (B) and impurities included in the polymerization system, and therefore (ii) control the reaction successfully.

In a case where the number of added agents (i.e., the denaturing agent (C), the coupling agent, etc.) in production of the conjugated diene rubber of the present invention is not less than 2, an order of addition of these agents to the polymerization system is not particularly limited. For example, in a case where the denaturing agent (C) and the halide silicon compound as the coupling agent having, per molecule, not less than 5 silicon-halogen atomic bonds, are used, an order of addition of these is not particularly limited. However, in this case, it is preferable to add the coupling agent to the polymerization system before the addition of the denaturing agent (C). With this order, (i) it becomes possible to obtain, via the coupling agent, a hyperbranched conjugated diene rubber more easily, and (ii) a tire made from the hyperbranched conjugated diene rubber becomes greater in driveability.

A condition under which the denaturing agent (C), the coupling agent, etc. are subjected to reaction is such that (i) a temperature is generally in a range of 0° C. to 100° C., preferably in a range of 30° C. to 90° C., and (ii) a reaction time is generally in a range of 1 minute to 120 minutes, preferably in a range of 2 minutes to 60 minutes.

After the denaturing agent (C) is reacted with the conjugated diene polymer chain (B), the active terminal is preferably deactivated by addition of alcohol such as methanol or water.

After the active terminal of the conjugated diene polymer chain (B) is deactivated, an antioxidant such as a phenolic stabilizer, a phosphorous stabilizer, and a sulfur stabilizer, a crumb agent, a scale inhibitor, etc. are added to the polymerization solution, if necessary. Then the polymerization solution is subjected to direct drying, or is subjected to steam stripping, so that a polymerization solvent is separated from the polymerization solution. Then, the conjugated diene rubber of the present invention is recovered. Note that, it is possible that, before the separation of the polymerization solvent from the polymerization solution is carried out, extender oil is mixed with the polymerization solution, and then the conjugated diene rubber of the present invention is recovered as oil extended rubber.

Examples of the extender oil, used to recover the conjugated diene rubber of the present invention as oil extended rubber, encompass a paraffinic petroleum softener, aromatic petroleum softener, a naphthenic petroleum softener, a plant softener, and aliphatic acid. In a case where a petroleum softener is used, it is preferable that the petroleum softener contains polycyclic aromatic series in an amount of less than 3%. The amount of the polycyclic aromatic series in the petroleum softener can be measured by a method of IP346 (an inspection method of The Institute Petroleum in England). In a case where the extender oil is used, a used amount of the extender oil is generally in a range of 5 parts by weight to 100 parts by weight with respect to 100 parts by weight of the conjugated diene rubber, preferably in a range of 10 parts by weight to 60 parts by weight with respect to 100 parts by weight of the conjugated diene rubber, more preferably in a range of 20 parts by weight to 50 parts by weight with respect to 100 parts by weight of the conjugated diene rubber.

The conjugated diene rubber of the present invention contains such a structure that not less than 3 conjugated diene polymer chains (B) are bound to each other via the denaturing agent (C), and an amount of the structure in the conjugated diene rubber is not less than 5% by weight, preferably in a range of 5% by weight to 40% by weight, more preferably in a range of 10% by weight to 30% by weight. With the arrangement in which the amount of such a structure in the conjugated diene rubber is not less than 5% by weight, it becomes possible to achieve a successful coagulating property and a successful drying property in production of the conjugated diene rubber. Further, with the arrangement, in a case where silica is added to the conjugated diene rubber, it is possible to provide a rubber composition which is greater in processability and a tire which is greater in low-heat buildup property. Note that a proportion of such a structure that not less than 3 conjugated diene polymer chains (B) are bound to each other via the denaturing agent (C) or the coupling agent, with respect to a total amount of the conjugated diene polymer finally obtained, is referred to as "coupling percentage of the structure having not less than 3 branches". The coupling percentage can be measured by gel permeation chromatography as the polystyrene conversion value. As to the conjugated diene polymer chain (B), a coupling percentage of the structure having not less than 3 branches is obtained in such a manner that (i), on the basis of a chart obtained by the gel permeation chromatography measurement, a ratio of an area of a peak part to a total elution area is found, which peak part has a peak top molecular weight that is not less than 2.8 times that of a peak having a minimum molecular weight, and (ii) the ratio is used as the coupling percentage.

A weight average molecular weight of the conjugated diene rubber of the present invention is not particularly limited. However, as the weight average molecular weight of the conjugated diene rubber, a value measured by the gel permeation chromatography as the polystyrene conversion value is generally in a range of 1,000 to 3,000,000, preferably in a range of 100,000 to 2,000,000, more preferably in a range of 300,000 to 1,500,000. In a case where the weight average molecular weight is not more than 3,000,000, it becomes easy to add silica to the conjugated diene rubber, and as a result, a rubber composition to be obtained would be excellent in processability. Further, in a case where the weight average molecular weight is not less than 1,000, a tire to be obtained would be excellent in low-heat buildup property.

A molecular weight distribution of the conjugated diene rubber of the present invention, represented by a ratio (Mw/Mn) of a weight average molecular weight (Mw) of the conjugated diene rubber of the present invention to a number average molecular weight (Mn) of the conjugated diene rubber of the present invention, is not particularly limited. However, a value of the molecular weight distribution is preferably in a range of 1.1 to 3.0, more preferably in a range of 1.2 to 2.5, further more preferably in a range of 1.3 to 2.2. In a case where a value of the molecular weight distribution is not more than 3.0, a tire to be obtained would be excellent in low-heat buildup property.

A Mooney viscosity ($ML_{1+4}$, 100° C.) of the conjugated diene rubber of the present invention is not particularly limited. However, a Mooney viscosity (ML1+4, 100° C.) of the conjugated diene rubber is generally in a range of 20 to 100, preferably in a range of 30 to 90, more preferably in a range of 40 to 80. Note that, in a case where the conjugated diene rubber is oil extended rubber, it is preferable that a Mooney viscosity (ML1+4, 100° C.) of the oil extended rubber is in the aforementioned range.

With addition of a compounding ingredient such as a cross-linking agent and a filler, the conjugated diene rubber of the present invention can be suitably used for various purposes. Among these, in a case where silica is added to the conjugated diene rubber as a filler, it becomes possible to provide a rubber composition which can be suitably used to obtain a tire which is excellent in strength, low-heat buildup property, wet grip property, and driveability.

[Rubber Composition]

A rubber composition of the present invention contains (i) 100 parts by weight of a rubber component containing the aforementioned conjugated rubber of the present invention, and (ii) silica in an amount in a range of 10 parts by weight to 200 parts by weight.

The rubber composition of the present invention can contain rubber other than the conjugated diene rubber of the present invention. The rubber other than the conjugated diene rubber of the present invention is not particularly limited. Examples of such rubber encompass natural rubber, polyisoprene rubber, emulsion polymerization styrene-butadiene copolymerized rubber, solution polymerization styrene-butadiene copolymerized rubber, polybutadiene rubber (which may be polybutadiene rubber containing crystal fiber made from a 1,2-polybutadiene polymer), styrene-isoprene copolymerized rubber, butadiene-isoprene copolymerized rubber, styrene-isoprene-butadiene copolymerized rubber, acrylonitiril-butadiene copolymerized rubber acrylonitiril-styrene-butadiene copolymerized rubber. Note that the rubber selected from these is not identical with the conjugated diene rubber of the present invention. Among these, it is preferable to use, as the rubber other than the conjugated diene rubber of the present invention, natural rubber, polyisoprene rubber, polybutadiene rubber, or solution polymerization styrene-butadiene copolymerized rubber. It is possible to use one of these rubbers solely as the rubber other than the conjugated diene rubber of the present invention. Alternatively, it is possible to use, as the rubber other than the conjugated diene rubber of the present invention, a combination of at least two of these rubbers.

In the rubber composition of the present invention, an amount of the conjugated diene rubber of the present invention in a rubber component is preferably in a range of 10% by weight to 100% by weight, more preferably in a range of 20% by weight to 100% by weight, further more preferably in a range of 50% by weight to 100% by weight. In a case where the rubber component contains the conjugated diene rubber of the present invention in an amount in the aforementioned range, it is possible to obtain a rubber composition from which a tire that is particularly excellent in strength, low-heat buildup property, wet grip property, and driveability can be made.

The rubber composition of the present invention contains silica, and an amount of silica in the rubber composition is in a range of 10 parts by weight to 200 parts by weight with respect to 100 parts by weight of the rubber component, preferably in a range of 20 parts by weight to 150 parts by weight, more preferably in a range of 30 parts by weight to 120 parts by weight. With the use of silica whose amount in the rubber composition is in the aforementioned range, a tire made from the rubber composition of the present invention would be particularly excellent in low-heat buildup property. Silica used in the rubber composition is not particularly limited, and examples of such silica encompass dry-process white carbon, wet-process white carbon, colloidal silica, and precipitated silica. Among these, it is preferable to use, as such silica, wet process white carbon whose main component is hydrous silic acid. Further, it is also possible to use, as such silica, a carbon-silica dual phase filler in which silica is supported on a surface of carbon black. It is possible to use, as the above silica, one of these solely. Alternatively, it is possible to use, as the above silica, a combination of at least two of these.

A nitrogen adsorption specific surface area (measured by a BET method in accordance with ASTM D3037-81) of the silica thus used is preferably in a range of 50 $m^2/g$ to 300 $m^2/g$, more preferably in a range of 80 $m^2/g$ to 220 $m^2/g$, further more preferably in a range of 100 $m^2/g$ to 170 $m^2/g$. In a case where a nitrogen adsorption specific surface area of the silica is in the aforementioned range, it is possible to obtain a rubber composition from which a tire that is greater in low-heat buildup property can be made. Further, a pH of the silica is preferably less than pH 7, more preferably in a range of pH 5 to pH 6.9.

In view of further improvement in low-heat buildup property of the tire, it is preferable that the rubber composition of the present invention further contains a silane coupling agent. The silane coupling agent is not particularly limited. Examples of the silane coupling agent encompass vinyltriethoxysilane, β-(3,4-epoxycyclohexyl) ethyltrimethoxysilane, N-(β-aminoethyl)-γ-aminopropyltrimethoxysilane, 3-octathio-1-propyl-triethoxysilane, bis(3-(triethoxysilyl) propyl) disulfide, bis(3-(triethoxysilyl) propyl) tetrasulfide, γ-trimethoxysilylpropyldimethylthiocarbamyltetrasulfide, and γ-trimethoxysilylpropylbenzothiazyltetrasulfide. Among these, in view of preventing generation of a scorch in kneading, it is preferable to employ a silane coupling agent in which the number of sulfur atoms contained per molecule is not more than 4. It is possible to employ one of these solely, as the silane coupling agent. Alternatively, it is possible to employ, as the silane coupling agent, a combination of at least two of these. An amount of the silane coupling agent in the rubber composition is preferably in a range of 0.1 part by weight to 30 parts by weight with respect to 100 parts by weight of silica, more preferably in a range of 1 part by weight to 15 parts by weight with respect to 100 parts by weight of silica.

The rubber composition of the present invention can further contain carbon black such as furnace black, acetylene black, thermal black, channel black, and graphite. In a case where the rubber composition contains carbon black, it is preferable to use furnace black. Specific examples of furnace black encompass SAF, ISAF, ISAF-HS, ISAF-LS, IISAF-HS, HAF, HAF-HS, HAF-LS, T-HS, T-NS, MAF, N234, and FEF. It is possible to employ one of these solely, as the carbon black. Alternatively, it is possible to employ, as the carbon black, a combination of at least two of these. An amount of the carbon black in the rubber composition is generally not more than 120 parts by weight with respect to 100 parts by weight of a rubber component, and a total amount of the silica and the carbon black in the rubber composition is preferably in a range of 25 parts by weight to 120 parts by weight with respect to 100 parts by weight of a rubber component, more preferably in a range of 30 parts by weight to 100 parts by weight with respect to 100 parts by weight of a rubber component, further more preferably in a range of 35 parts by weight to 90 parts by weight with respect to 100 parts by weight of a rubber component.

A nitrogen adsorption specific surface area ($N_2SA$) of the carbon black is preferably in a range of 5 $m^2/g$ to 200 $m^2/g$, more preferably in a range of 20 $m^2/g$ to 150 $m^2/g$, further more preferably in a range of 40 $m^2/g$ to 130 $m^2/g$. An adsorbed amount of dibutyl phthalate (DBP) is preferably in a range of 5 ml/100 g to 200 ml/100 g, more preferably in a range of 50 ml/100 g to 160 ml/100 g, further more preferably in a range of 70 ml/100 g to 130 ml/100 g. In a case where the nitrogen adsorption specific surface area of the carbon black is in the aforementioned range, it is possible to obtain a rubber composition which is excellent in forming property and from which a tire that is particularly excellent in low-heat buildup property can be made.

How to add a filler such as silica and carbon black to the rubber composition is not particularly limited, and may be (i) a method of adding the filler to solid rubber and kneading the solid rubber (dry-kneading method), or (ii) a method of adding a filler to a solution of rubber and coagulating and drying the solution (wet-kneading method), for example.

The rubber composition of the present invention preferably further contains a cross-linking agent. The cross-linking agent is not particularly limited, and examples of the cross-linking agent encompass sulfur, halide sulfur, organic peroxide, quinone dioxime, an organic multivalent amine compound, and an alkylphenol resin having a methylol group. Among these, it is preferable to employ sulfur as the cross-linking agent. An amount of the cross-linking agent in the rubber composition is preferably in a range of 0.1 part by weight to 15 parts by weight with respect to 100 parts by weight of a rubber component of the rubber composition, more preferably in a range of 0.5 part by weight to 5 parts by weight with respect to 100 parts by weight of the rubber component, further more preferably in a range of 1 part by weight to 4 parts by weight with respect to 100 parts by weight of the rubber component. In a case where an amount of the cross-linking agent in the rubber composition is in the aforementioned range, cross-linking can be sufficiently carried out, and a cross-linked rubber product to be obtained would be excellent in mechanical property.

In a case where sulfur or a compound containing sulfur is used as the cross-linking agent, it is preferable to use both a cross-linking accelerator and a cross-linking activator. The cross-linking accelerator is not particularly limited, and examples of the cross-linking accelerator encompass various cross-linking accelerators, such as sulfenamide series, guanidine series, thiourea series, thiazole series, thiuram series, dithiocarbamic acid salt series, and xanthogenic acid series. Among these, it is preferable to use the cross-linking accelerator containing a sulfenamide cross-linking accelerator. The cross-linking activator is not particularly limited, and examples of the cross-linking activator encompass zinc oxide and higher fatty acid such as stearic acid. It is possible to employ, as the cross-linking accelerator, one of these solely. Alternatively, it is possible to employ, as the cross-linking accelerator, a combination of at least two of these. Further, it is possible to employ, as the cross-linking activator, one of these solely. Alternatively, it is possible to employ, as the cross-linking activator, a combination of at least two of these.

An amount of the cross-linking accelerator in the rubber composition and an amount of the cross-linking activator in the rubber composition are, independently, preferably in a range of 0.05 part by weight to 15 parts by weight with respect to 100 parts by weight of a rubber component of the rubber composition, more preferably in a range of 0.5 part by weight to 10 parts by weight with respect to 100 parts by weight of the rubber component, further more preferably in a range of 1 part by weight to 5 parts by weight with respect to 100 parts by weight of the rubber component. In a case where an amount of the cross-linking accelerator in the rubber composition and an amount of the cross-linking activator in the rubber composition are, independently, in the aforementioned range, the cross-linking is sufficiently carried out, and a cross-linked rubber product to be obtained would be excellent in mechanical property.

In addition to the components described above, it is possible to add appropriately, to the rubber composition of the present invention, compounding ingredients generally used in a rubber processing field in accordance with desired target effects. Examples of such a compounding ingredient encompass, other than the aforementioned components, an antioxidant, a scorch retarder, an activator, process oil, a plasticizer, a lubricant, a filler (excluding silica and carbon black described above), and an adhesion promoting agent.

The rubber composition of the present invention can be obtained by kneading the components in accordance with a general method. For example, a target rubber composition can be obtained in such a manner that (i) the compounding ingredients excluding the cross-linking agent and the cross-linking accelerator are kneaded with a rubber component, and then (ii) the cross-linking agent and the cross-linking accelerator are mixed with the resultant kneaded product. A temperature at which the compounding ingredients excluding the cross-linking agent and the cross-linking accelerator and the rubber component are kneaded is preferably in a range of 80° C. to 200° C., more preferably in a range of 100° C. to 180° C. A kneading time is preferably in a range of 30 seconds to 30 minutes. The mixing of the kneaded product, the cross-linking accelerator, and the cross-linking agent is generally carried out after these are cooled down to a temperature of not more than 100° C., preferably not more than 80° C.

The rubber composition of the present invention can be cross-linked so as to be used as a tire, for example. In addition, the rubber composition of the present invention is applicable to rubber for reinforcing a resin, such as high-impact polystyrene and an ABS resin.

[Cross-Linked Rubber Product]

The cross-linked rubber product of the present invention is obtained in such a manner that the rubber composition of the present invention is formed and cross-linked. How to carry out the cross-linking and forming in producing a rubber product (cross-linked rubber product), such as a tire, by use of the rubber composition of the present invention, is not particularly limited, and can be selected in accordance with a shape of the cross-linked product, a size of the cross-linked product, and/or the like. For example, it is possible that a rubber composition containing a cross-linking agent is filled in a mold and is heated, so that the forming and the cross-linking are simultaneously carried out. Meanwhile, it is also possible that a rubber composition containing a cross-linking agent is formed in advance, and then is heated so as to be cross-linked. A temperature at which the forming is carried out is preferably in a range of 20° C. to 140° C., more preferably in a range of 40° C. to 130° C. A temperature at which the cross-linking is carried out is preferably in a range of 120° C. to 200° C., more preferably in a range of 140° C. to 180° C. A cross-linking time is generally in a range of 1 minute to 120 minutes.

The cross-linked rubber product of the present invention is applicable to various rubber products, such as a tire, a hose, a window frame, a belt, a shoe sole, vibration insulator rubber, an automobile part, and seismic isolation rubber. Among these, since the cross-linked rubber product of the present invention is particularly excellent in strength, low-heat buildup property, wet grip property, and driveability, the cross-linked rubber product of the present invention is suitably applicable to a tire. In various tires such as an all-season tire, a high-performance tire, and a winter tire, the cross-linked rubber product of the present invention is applicable to various parts of such a tire such as a tread, a carcass, a side wall, and a bead. Since the cross-linked rubber product is particularly excellent in low-heat buildup property, the cross-linked rubber product of the present invention is particularly suitable for use as a tread of a fuel-efficient tire.

As described above, a conjugated diene rubber of the present invention includes: such a structure that not less than 3 conjugated diene polymer chains are bound to each other via a denaturing agent, an amount of the structure in the conjugated diene rubber being not less than 5% by weight, the structure being obtained by causing the not less than 3 conjugated diene polymer chains and the denaturing agent to be reacted with each other, each of the not less than 3 conjugated diene polymer chains being such that at least one of terminals is an isoprene block having not less than 70% by weight of an isoprene monomer unit, and the other one of terminals is an active terminal, the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3.

Further, the conjugated diene rubber of the present invention is preferably arranged such that a vinyl bond content in the isoprene monomer unit of the isoprene block is in a range of 21% by weight to 85% by weight.

Furthermore, the conjugated diene rubber of the present invention is preferably arranged such that each of the not less than 3 conjugated diene polymer chains is such that a part other than the isoprene block is (i) a homopolymer chain of a conjugated diene monomer, or (ii) a copolymer chain of a conjugated diene monomer and an aromatic vinyl monomer, and a weight ratio of a conjugated diene monomer unit to an aromatic vinyl monomer unit (the conjugated diene monomer unit: the aromatic vinyl monomer unit) is in a range of 100:0 to 50:50.

Moreover, according to the present invention, a rubber composition includes: a rubber component in an amount of 100 parts by weight, the rubber component containing the conjugated diene rubber described above; and silica in an amount in a range of 10 parts by weight to 200 parts by weight.

Further, the rubber composition of the present invention preferably further includes: a cross-linking agent.

Furthermore, according to the present invention, a cross-linked rubber product is obtained by forming and cross-linking the rubber composition described above.

Moreover, according to the present invention, a tire is made of the cross-linked rubber product described above.

Further, according to the present invention, a method of producing a conjugated diene rubber includes the steps of: obtaining such a conjugated diene polymer chain that at least one of terminals is an isoprene block having not less than 70% by weight of an isoprene monomer unit, and the other one of terminals is an active terminal, the conjugated diene polymer chain being obtained by (a) causing, by use of a polymerization initiator, an isoprene monomer or a monomer mixture containing an isoprene monomer to be subjected to living polymerization in an inert solvent, so as to form an isoprene block having an active terminal, then, (b) causing a conjugated diene monomer or a monomer mixture containing a conjugated diene monomer to be bound to the isoprene block, so that the conjugated diene monomer or the monomer mixture containing the conjugated diene monomer is subjected to the living polymerization again; and causing the active terminal of the conjugated diene polymer chain and a denaturing agent to be reacted with each other, the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3, the reacting being carried out so that a ratio of (i) a total number of mols of the one or more epoxy groups in the denaturing agent reacted with the active terminal of the conjugated diene polymer chain, and mols of the hydrocarbyloxy groups in the one or more hydrocarbyloxysilyl groups in the denaturing agent, to (ii) 1 mol of the polymerization initiator used in the living polymerization, is in a range of 0.1 to 5.

Details of an embodiment of the present invention are further described below with examples. As a matter of course, the present invention is not limited to the following examples, and details of these examples can be modified variously. Further, the present invention is not limited to the description of the embodiments above, but may be altered by a skilled person within the scope of the claims. An embodiment based on a proper combination of technical means disclosed in different embodiments is encompassed in the technical scope of the present invention.

Note that "parts" and "%" in the following examples means "parts by weight" and "% by weight", respectively, unless otherwise noted.

EXAMPLES

[Evaluation Method]

Various properties were evaluated in accordance with the following methods.

(Weight Average Molecular Weight, Molecular Weight Distribution, and Coupling Percentage)

A weight average molecular weight, a molecular weight distribution, and a coupling percentage were found on the basis of a chart which was obtained based on a molecular weight of polystyrene conversion. The chart was obtained by gel permeation chromatography. Note that a specific measurement condition of the gel permeation chromatography was as described below.

Measuring instrument: HLC-8020 (manufactured by TOSOH CORPORATION)

Column: GMH-HR-H (manufactured by TOSOH CORPORATION) (two columns coupled in series)

Detector: differential refractometer RI-8020 (manufactured by TOSOH CORPORATION)

Eluant: tetrahydrofuran

Column temperature: 40° C.

The coupling percentage was such that a ratio of an area of a peak part to a total elution area was found as a coupling percentage of a structure having not less than 3 branches of conjugated diene polymer chains, which peak part has a peak top molecular weight that is not less than 2.8 times than that of a peak having a minimum molecular weight.

(Styrene Unit Content and Vinyl Bond Content)

A styrene unit content and a vinyl unit content were measured by use of $^1$H-NMR.

(Money Viscosity ($ML_{1+4}$, 100° C.))

A Mooney viscosity was measured by use of a Mooney viscometer (manufactured by Shimadzu Corporation) in accordance with JIS K6300.

(Tensile Strength)

For a tensile strength, a tensile test was carried out in accordance with JIS K6301, so as to measure a stress in a 300% stretched state. This property was represented by an index obtained by using a value measured in Comparative Example 5 (described later) as a reference sample of which an index is 100. The larger the index is, the greater the tensile strength of a cross-linked rubber product is.

(Wet Grip Property)

For a wet grip property, tanδ of a test piece (length: 50 mm, width: 12.7 mm, thickness: 2 mm) was measured by use of ARES (manufactured by LeoMetrix Co., Ltd.) under such a condition that (i) a dynamic distortion was 0.5%, (ii) a frequency was 10 Hz, and (iii) a temperature was 0° C. This property was represented by an index obtained by using a value measured in Comparative Example 5 (described later) as a reference sample of which an index is 100. The larger the index is, the greater the wet grip property of a tire made of a cross-linked rubber product is.

(Low-Heat Buildup Property)

For a low-heat buildup property, tanδ of a test piece (length: 50 mm, width: 12.7 mm, thickness: 2 mm) was measured by use of ARES (manufactured by LeoMetrix Co., Ltd.) under such a condition that (i) a dynamic distortion was 2.5%, (ii) a frequency was 10 Hz, and (iii) a temperature was 60° C. This property was represented by an index obtained by using a value measured in Comparative Example 5 (described later) as a reference sample of which an index is 100. The smaller the index is, the greater the low-heat buildup property of a tire made of a cross-linked rubber product is.

(Driveability)

For a driveability, a tensile test was carried out in accordance with JIS K6301 so as to measure/calculate a value of (a stress in a 300% stretched state)/(a stress in a 100% stretched state). The larger the value is, the greater the driveability of a tire made of a cross-linked rubber product is.

Example 1

Preparation of Conjugated Diene Rubber I

Into a nitrogen-substituted 100 ml ampule, 28 g of cyclohexane and 8.6 mmol of tetramethylethylenediamine were added, and then, 6.1 mmol of n-butyllithium was also added into the ampule. Next, 8.0 g of isoprene was slowly added, and was caused to be reacted for 120 minutes in the ampule at a temperature of 60° C. As a result, an initiator 1 was obtained. As to the initiator 1 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under the presence of nitrogen. Then, a total amount of the initiator 1 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.08 mmol of 1,6-bis(trichlorosilyl) hexane as a 20% by weight cyclohexane solution was added to the autoclave, and reaction took place for 10 minutes. Further, 0.027 mmol of polyorganosiloxane A represented by the following formula (VII) as a 20% by weight xylene solution was added, and reaction took place for 30 minutes. After that, methanol was added as a polymerization terminator. An amount (mol) of methanol was twice that of n-butyllithium thus used. A solution containing a conjugated diene rubber I was thus obtained. To the solution, 0.15 part of Irganox 1520L (produced by Ciba Specialty Chemicals Inc.) with respect to 100 parts of the conjugated diene rubber I was added as an antioxidant. After that, a solvent was removed by steam stripping. Then, the solution was subjected to vacuum drying for 24 hours at a temperature of 60° C. A solid conjugated diene rubber I was thus obtained.

[Chemical Formula 6]

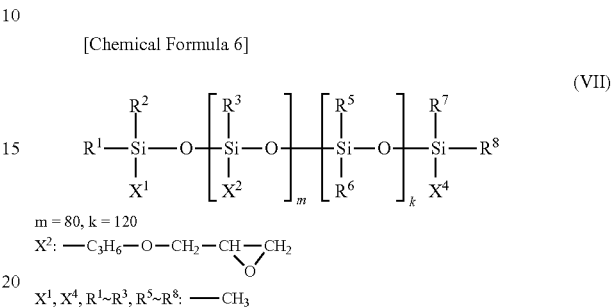

$m = 80, k = 120$ $X^2$: —$C_3H_6$—O—$CH_2$—CH—$CH_2$
                            \\O/

$X^1, X^4, R^1 \sim R^3, R^5 \sim R^8$: —$CH_3$

As to the rubber thus obtained, a weight average molecular weight, a molecular weight distribution, a coupling percentage, a styrene unit content, a vinyl bond content, and a Mooney viscosity were measured. Table 1 shows results of the measurement.

TABLE 1

| | EXAMPLES | | | | COMPARATIVE EXAMPLES | | | |
|---|---|---|---|---|---|---|---|---|
| | 1 | 2 | 3 | 4 | 1 | 2 | 3 | 4 |
| INITIATOR*1 | IP-Li | IP-Li | IP-Li | IP-Li | IP-Li | n-BuLi | n-BuLi | IP-Li |
| SCDPC*2 | IP-SB | IP-SB | IP-SB | IP-SB | IP-SB | SB-IP | SB | IP-SB |
| WAMW (× 10⁴) OF IB ON PIT | 0.22 | 0.25 | 0.31 | 0.35 | 0.34 | — | — | 1.67 |
| VBC (wt %) OF IB ON PIT | 72.3 | 54.8 | 21.3 | 65.9 | 71.3 | — | — | 59.8 |
| MWD (Mw/Mn) OF IB ON PIT | 1.08 | 1.09 | 1.06 | 1.10 | 1.12 | — | — | 1.09 |
| CA | 1,6-B (TS) H | — | — | — | SnCl₄ | — | — | — |
| DA | POSA | POSA | POSA | N,N-B(TS)-3-APTS | — | POSA | N,N-B(TS)-3-APTS | N,N-B(TS)-3-APTS |
| RMCDR | | | | | | | | |
| SMC (wt %) | 21.0 | 21.1 | 20.8 | 20.5 | 20.5 | 20.9 | 21.3 | 21.0 |
| VBC (wt %) | 63.3 | 62.9 | 62.5 | 60.9 | 63.3 | 61.9 | 62.2 | 63.5 |
| WAMW (× 10⁴) | 43.5 | 47.8 | 46.0 | 32.0 | 36.0 | 46.9 | 33.0 | 39.2 |
| MWD (Mw/Mn) | 1.46 | 1.50 | 1.46 | 1.44 | 1.32 | 1.44 | 1.45 | 1.41 |
| CP OF 3 OR MORE (%) | 25.0 | 21.0 | 20.7 | 5.6 | 34.7 | 20.8 | 5.5 | 3.4 |
| MV | 58.0 | 65.6 | 62.0 | 44.0 | 48.4 | 61.3 | 45.0 | 62.2 |

*1 IP-Li: Isoprenyl-lithium
*2 IP: Isoprene block, SB: Random block of styrene and butadiene (polymerization was initiated from block on left side in Table 1)
Abbreviations
SCDPC: Structure of conjugated diene polymer chain
WAMW (× 10⁴) OF IB ON PIT: Weight average molecular weight (× 10⁴) of isoprene block on polymerization initiation terminal side
VBC (wt %) OF IB ON PIT: Vinyl bond content (wt %) of isoprene block on polymerization initiation terminal side
MWD (Mw/Mn) OF IB ON PIT: Molecular weight distribution (Mw/Mn) of isoprene block on polymerization initiation terminal side
CA: Coupling agent
1,6-B (TS) H: 1,6-bis (trichlorosilyl) hexane
DA: Denaturating agent
POSA: Polyorganosiloxane A
N,N-B (TS)-3-APTS: N,N-bis (trimethylsilyl)-3-aminopropyltriethoxysilane
RMCDR: Results of measurement of a conjugated diene rubber
SMC (wt %): Styrene unit content (wt %)
VBC (wt %): Vinyl bond content (wt %)
WAMW (× 10⁴): Weight average molecular weight (× 10⁴)
MWD (Mw/Mn): Molecular weight distribution (Mw/Mn)
CP OF 3 OR MORE (%): Coupling percentage (%) of structure having not less than 3 branches
MV: Mooney viscosity

Example 2

Preparation of Conjugated Diene Rubber II

Into a nitrogen-substituted 100 ml ampule, 28 g of cyclohexane and 7.5 mmol of tetramethylethylenediamine were added, and then, 5.4 mmol of n-butyllithium was also added into the ampule. Next, 7.0 g of isoprene was slowly added, and was caused to be reacted for 120 minutes in the ampule at a temperature of 70° C. As a result, an initiator 2 was obtained. As to the initiator 2 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under the presence of nitrogen. Then, a total amount of the initiator 2 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.023 mmol of polyorganosiloxane A represented by the above formula (VII) as a 20% by weight xylene solution was added, and reaction took place for 30 minutes. After that, methanol was added as a polymerization terminator. An amount (mol) of methanol was twice that of n-butyllithium thus used. A solution containing a conjugated diene rubber II was thus obtained. To the solution, 0.15 part of Irganox 1520L (produced by Ciba Specialty Chemicals Inc.) with respect to 100 parts of the conjugated diene rubber II was added as an antioxidant. After that, a solvent was removed by steam stripping. Then, the solution was subjected to vacuum drying for 24 hours at a temperature of 60° C. A solid conjugated diene rubber II was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Example 3

Preparation of Conjugated Diene Rubber III

Into a nitrogen-substituted 100 ml ampule, 50 g of cyclohexane and 0.9 mmol of tetramethylethylenediamine were added, and then, 5.4 mmol of n-butyllithium was also added into the ampule. Next, 9.0 g of isoprene was slowly added, and was caused to be reacted for 120 minutes in the ampule at a temperature of 70° C. As a result, an initiator 3 was obtained. As to the initiator 3 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under nitrogen atmosphere. After that, 6.6 mmol of tetramethylethylenediamine were added, and then, a total amount of the initiator 3 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.023 mmol of polyorganosiloxane A represented by the above formula (VII) as a 20% by weight xylene solution was added, and reaction took place for 30 minutes. After that, methanol was added as a polymerization terminator. An amount (mol) of methanol was twice that of n-butyllithium thus used. A solution containing a conjugated diene rubber III was thus obtained. To the solution, 0.15 part of Irganox 1520L (produced by Ciba Specialty Chemicals Inc.) with respect to 100 parts of the conjugated diene rubber III was added as an antioxidant. After that, a solvent was removed by steam stripping. Then, the solution was subjected to vacuum drying for 24 hours at a temperature of 60° C. A solid conjugated diene rubber III was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Example 4

Preparation of Conjugated Diene Rubber IV

Into a nitrogen-substituted 100 ml ampule, 50 g of cyclohexane and 7.0 mmol of tetramethylethylenediamine were added, and then, 5.1 mmol of n-butyllithium was also added into the ampule. Next, 10.2 g of isoprene was slowly added, and was caused to be reacted for 120 minutes in the ampule at a temperature of 60° C. As a result, an initiator 4 was obtained. As to the initiator 4 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under nitrogen atmosphere. Then, a total amount of the initiator 4 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.55 mmol of N,N-bis (trimethylsilyl)-3-aminopropyltriethoxysilane as a 20% by weight xylene solution was added, and reaction took place for minutes. Then, 2.5 mmol of N,N-bis (trimethylsilyl)-3-aminopropyltriethoxysilane as a 20% by weight xylene solution was added, and reaction took place for minutes. After that, methanol was added as a polymerization terminator. An amount (mol) of methanol was twice that of n-butyllithium thus used. A solution containing a conjugated diene rubber IV was thus obtained. To the solution, 0.15 part of Irganox 1520L (produced by Ciba Specialty Chemicals Inc.) with respect to 100 parts of the conjugated diene rubber IV was added as an antioxidant. After that, a solvent was removed by steam stripping. Then, the solution was subjected to vacuum drying for 24 hours at a temperature of 60° C. A solid conjugated diene rubber IV was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Comparative Example 1

Preparation of Conjugated Diene Rubber i

Into a nitrogen-substituted 100 ml ampule, 50 g of cyclohexane and 7.0 mmol of tetramethylethylenediamine were added, and then, 5.1 mmol of n-butyllithium was also added into the ampule. Next, 9.8 g of isoprene was slowly added, and was caused to be reacted for 120 minutes in the ampule at a temperature of 60° C. As a result, an initiator 5 was obtained. As to the initiator 5 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under nitrogen atmosphere. Then, a total amount of the initiator 5 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.51 mmol of tin tetrachloride as a 20% by weight cyclohexane solution was added, and reaction took place for minutes. After that, methanol was added as a polymerization terminator. An amount (mol) of methanol was twice that of n-butyllithium thus used. A solution containing a conjugated diene rubber i was thus obtained. To the solution, 0.15 part of Irganox 1520L (produced by Ciba Specialty Chemicals Inc.) with respect to 100 parts of the conjugated diene rubber i was added as an antioxidant. After that, a solvent was removed by steam stripping. Then, the solution was subjected to vacuum drying for 24 hours at a temperature of 60° C. A solid conjugated diene rubber i was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Comparative Example 2

Preparation of Conjugated Diene Rubber ii

Into an autoclave having an agitator, 4000 g of cyclohexane, 357.7 g of 1,3-butadiene, and 132.3 g of styrene were provided under nitrogen atmosphere. Then, 7.5 mmol of tetraethylenediamine was added, after that, 5.4 mmol of n-butyllithium was added. A polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 7.0 g of isoprene was added, and reaction took place for 10 minutes. Then, 0.023 mmol of polyorganosiloxane A represented by the above formula (VII) as a 20% by weight xylene solution was added, and reaction took place for 30 minutes. After that, methanol was added as a polymerization terminator. An amount (mol) of methanol was twice that of n-butyllithium thus used. A solution containing a conjugated diene rubber ii was thus obtained. To the solution, 0.15 part of Irganox 1520L (produced by Ciba Specialty Chemicals Inc.) with respect to 100 parts of the conjugated diene rubber ii was added as an antioxidant. After that, a solvent was removed by steam stripping. Then, the solution was subjected to vacuum drying for 24 hours at a temperature of 60° C. A solid conjugated diene rubber ii was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Comparative Example 3

Preparation of Conjugated Diene Rubber iii

Into an autoclave having an agitator, 4000 g of cyclohexane, 357.7 g of 1,3-butadiene, and 132.3 g of styrene were provided under the presence of nitrogen. Then, 6.7 mmol of tetraethylenediamine was added, after that, 4.9 mmol of n-butyllithium was added. A polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, the polymerization reaction was further kept for 20 minutes. After confirmation that a polymerization conversion became in a range of 95% to 100%, 0.55 mmol of N,N-bis (trimethylsilyl)-3-aminopropyltriethoxysilane as a 20% by weight xylene solution was added, and reaction took place for minutes. Then, 2.5 mmol of N,N-bis (trimethylsilyl)-3-aminopropyltriethoxysilane as a 20% by weight xylene solution was added, and reaction took place for minutes. After that, methanol was added as a polymerization terminator. An amount (mol) of methanol was twice that of n-butyllithium thus used. A solution containing a conjugated diene rubber iii was thus obtained. To the solution, 0.15 part of Irganox 1520L (produced by Ciba Specialty Chemicals Inc.) with respect to 100 parts of the conjugated diene rubber iii was added as an antioxidant. After that, a solvent was removed by steam stripping. Then, the solution was subjected to vacuum drying for 24 hours at a temperature of 60° C. A solid conjugated diene rubber iii was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Comparative Example 4

Preparation of Conjugated Diene Rubber iv

Into a nitrogen-substituted 800 ml glass bottle, 200 g of cyclohexane and 7.0 mmol of tetramethylethylenediamine were added, and then, 5.0 mmol of n-butyllithium was also added into the glass bottle. Next, 50 g of isoprene was slowly added, and was caused to be reacted for 120 minutes in the glass bottle at a temperature of 60° C. As a result, an initiator 6 was obtained. As to the initiator 6 (isoprene block), a weight average molecular weight, a molecular weight distribution, and a vinyl bond content were measured. Table 1 shows the results of the measurement.

Next, into an autoclave having an agitator, 4000 g of cyclohexane, 357.7 g of 1,3-butadiene, and 132.3 g of styrene were provided under nitrogen atmosphere. Then, a total amount of the initiator 6 was added to the autoclave, so that polymerization was initiated at a temperature of 40° C. When 10 minutes elapsed after the polymerization was initiated, 195.3 g of 1,3-butadiene and 14.7 g of styrene were added to the autoclave continuously for 60 minutes. A highest temperature in polymerization reaction was 60° C. After the continuous addition was finished, polymerization reaction was further kept for 20 minutes. After confirmation that a polymerization conversion became in a range of 95% to 100%, 0.49 mmol of N,N-bis (trimethylsilyl)-3-aminopropyltriethoxysilane as a 20% by weight xylene solution was added, and reaction took place for 10 minutes. Then, 2.5 mmol of N,N-bis (trimethylsilyl)-3-aminopropyltriethoxysilane as a 20% by weight xylene solution was added, and reaction took place for minutes. After that, methanol was added as a polymerization terminator. An amount (mol) of methanol was twice that of n-butyllithium thus used. A solution containing a conjugated diene rubber iv was thus obtained. To the solution, 0.15 part of Irganox 1520L (produced by Ciba Specialty Chemicals Inc.) with respect to 100 parts of the conjugated diene rubber iv was added as an antioxidant. After that, a solvent was removed by steam stripping. Then, the solution was subjected to vacuum drying for 24 hours at a temperature of 60° C. A solid conjugated diene rubber iv was thus obtained.

As to the rubber thus obtained, a weight average molecular weight, a molecular weight distribution, a coupling percentage, a styrene unit content, a vinyl bond content, and a Mooney viscosity were measured. Table 1 shows results of the measurement.

Example 5

Evaluation of Property of Rubber Composition Containing Conjugated Diene Rubber I By use of a Banbury mixer whose volume was 250 ml, 100 parts of the conjugated diene rubber I obtained in Example 1 was subjected to mastication. Then, 40 parts of silica ("Zeosil 1165 MP", produced by Rhodia S.A., nitrogen adsorption specific surface area (BET method): 163 m$^2$/g), 4.3 parts of a silane coupling agent (bis(3-(triethoxysilyl) propyl) tetrasulfide, "Si69", produced by Degussa AG), and 10 parts of process oil ("Fukkol Elamic 30", produced by Nippon Oil Corporation) were added, and kneading was carried out for 1.5 minutes (initiation temperature: 110° C.). To a kneaded product thus obtained, 14 parts of silica ("Zeosil 1165 MP", produced by Rhodia S.A.), 6 parts of carbon black ("SEAST 7HM", produced by Tokai Carbon Co., Ltd.), 3 parts of zinc oxide (zinc white No. 1), 2 parts of stearic acid ("SA-300", produced by Asahi Denka Kogyo Co., Ltd), and 2 parts of an antioxidant (N-phenyl-N'-(1, 3-dimethylbutyl)-p-phenylenediamine, "NOCRAC 6C", produced by OUCHI SHINKO CHEMICAL INDUSTRIAL CO., LTD) were added. Then, the kneaded product was subjected to kneading for 2.5 minutes. After that, a rubber composition was ejected from the Banbury mixer. When the kneading was finished, a temperature of the rubber composition was 150° C. The rubber composition thus obtained was cooled down to room temperature, and then was again kneaded in the Banbury mixer for 3 minutes. After that, the rubber composition was ejected from the Banbury mixer. Next, by use of an open roll whose temperature was 50° C., the rubber composition thus obtained, 1.6 parts of sulfur, and a cross-linking accelerator (a mixture of (i) 1.4 parts of N-t-butyl-2-benzothiazolsulfenamide ("NOCCELER NS", produced by OUCHI SHINKO CHEMICAL INDUSTRIAL CO., LTD), and (ii) 1.4 parts of diphenylguanidine ("NOCCELER D", produced by OUCHI SHINKO CHEMICAL INDUSTRIAL CO., LTD)) were kneaded together. Then, a sheet-form rubber composition was taken out.

The rubber composition thus obtained was pressed for minutes at a temperature of 160° C. so as to be cross-linked. Each test piece was thus produced. Each test piece was evaluated in tensile strength, wet grip property, low-heat buildup property, and driveability. Table 2 shows results of the evaluation.

TABLE 2

|  | EXAMPLES | | | | COMPARATIVE EXAMPLES | | | |
| --- | --- | --- | --- | --- | --- | --- | --- | --- |
|  | 5 | 6 | 7 | 8 | 5 | 6 | 7 | 8 |
| USED RUBBER (REFERENCE SIGN) | I | II | III | IV | i | ii | iii | iv |
| RESULTS | | | | | | | | |
| TENSILE STRENGTH | 110 | 108 | 105 | 102 | 82 | 100 | 95 | 98 |
| WET GRIP PROPERTY | 117 | 114 | 106 | 108 | 63 | 100 | 95 | 105 |
| LOW-HEAT BUILDUP PROPERTY | 77 | 82 | 90 | 92 | 185 | 100 | 102 | 98 |
| DRIVEABILITY | 5.7 | 5.7 | 5.6 | 5.4 | 4.6 | 5.1 | 5.0 | 5.0 |

Note that each of values of a tensile strength, a wet grip property, and a low-heat buildup property was an index obtained by using that of Comparative Example 6 as a reference value (100).

[Evaluation of Property of Rubber Compositions Containing Respective Conjugated Diene Rubbers II Through IV (Examples 6 through 8) and Rubber Compositions Containing Respective Conjugated Diene Rubbers i through iv (Comparative Examples 5 through 8)]

A rubber composition was obtained in the same manner as Example 5, except that, in place of the conjugated diene rubber I, each of the following rubbers was employed: the conjugated diene rubber II (Example 6) obtained in Example 2, the conjugated diene rubber III (Example 7) obtained in Example 3, the conjugated diene rubber IV (Example 8) obtained in Example 4, the conjugated diene rubber i (Comparative Example 5) obtained in Comparative Example 1, the conjugated diene rubber ii (Comparative Example 6) obtained in Comparative Example 2, the conjugated diene rubber iii (Comparative Example 7) obtained in Comparative Example 3, and the conjugated diene rubber iv (Comparative Example 8) obtained in Comparative Example 4. Each test piece was evaluated. Table 2 shows results of the evaluation.

On the basis of the results thus obtained, the following fact was found. That is, each of rubber compositions (Examples 5 through 8) of the present invention, containing respective conjugated diene rubbers of Examples 1 through 4 corresponding to conjugated diene rubbers of the present invention, was greater in (i) tensile strength of a cross-linked product (i.e., a tire) obtained from the rubber composition, (ii) low-heat buildup property of the cross-linked product, (iii) wet grip property of the cross-linked product, and (iv) driveability of the cross-linked product, than any of (I) a rubber composition (Comparative Example 5) containing the conjugated diene rubber of Comparative Example 1, in which a terminal other than a terminal having an isoprene block was not denaturalized, (II) a rubber composition (Comparative Example 6) containing the conjugated diene rubber of Comparative Example 2, in which a terminal other than a denaturalized terminal did not have an isoprene block, (III) a rubber composition (Comparative Example 7) containing the conjugated diene rubber of Comparative Example 3, in which a terminal other than a denaturalized terminal did not have an isoprene block, and (IV) a rubber composition (Comparative Example 8) containing the conjugated diene rubber of Comparative Example 4, in which a coupling percentage of a structure having not less than 3 branches was less than 5% by weight.

INDUSTRIAL APPLICABILITY

The present invention is applicable to any industrial field employing rubber or a resin, for example. Particularly, the present invention is suitably applicable to a rubber product such as a tire.

The invention claimed is:

1. A conjugated diene rubber comprising:
such a structure that not less than 3 conjugated diene polymer chains are bound to each other via a denaturing agent, an amount of the structure in the conjugated diene rubber being not less than 5% by weight, the structure being obtained by causing the not less than 3 conjugated diene polymer chains and the denaturing agent to be reacted with each other,
each of the not less than 3 conjugated diene polymer chains having (i) at least one of terminals which is an isoprene block having not less than 70% by weight of an isoprene monomer unit, (ii) the other one of terminals which is an active terminal, and (iii) a part other than the isoprene block having 0% by weight or more but less than 70% by weight of an isoprene monomer unit,
each of the not less than 3 conjugated diene polymer chains being such that the part other than the isoprene block is a homopolymer chain of a conjugated diene monomer, or a copolymer chain of a conjugated diene monomer and an aromatic vinyl monomer, wherein a weight ratio of a conjugated diene monomer unit to an aromatic vinyl monomer unit (the conjugated diene monomer unit: the aromatic vinyl monomer unit) is in a range of 100:0 to 50:50, and a polymerization type of the copolymer chain of the conjugated diene monomer and the aromatic vinyl monomer is a random type,
the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3.

2. The conjugated diene rubber as set forth in claim 1, wherein:
a vinyl bond content in the isoprene monomer unit of the isoprene block is in a range of 21% by weight to 85% by weight.

3. A rubber composition comprising:
a rubber component in an amount of 100 parts by weight, the rubber component containing the conjugated diene rubber recited in claim 1; and
silica in an amount in a range of 10 parts by weight to 200 parts by weight.

4. The rubber composition as set forth in claim 3, further comprising:
a cross-linking agent.

5. A cross-linked rubber product obtained by forming and cross-linking the rubber composition recited in claim 4.

6. A tire made of the cross-linked rubber product recited in claim 5.

7. A method of producing a conjugated diene rubber as set forth in claim 1, the method comprising the steps of:
obtaining a conjugated diene polymer chain having (i) at least one of terminals which is an isoprene block having not less than 70% by weight of an isoprene monomer unit, (ii) the other one of terminals which is an active terminal, and (iii) a part other than the isoprene block having 0% by weight or more but less than 70% by weight of an isoprene monomer unit, the part other than the isoprene block being a homopolymer chain of a conjugated diene monomer, or a copolymer chain of a conjugated diene monomer and an aromatic vinyl monomer, wherein in a case where the part other than the isoprene block is the copolymer chain of the conjugated diene monomer and the aromatic vinyl monomer, a weight ratio of a conjugated diene monomer unit to an aromatic vinyl monomer unit (the conjugated diene monomer unit: the aromatic vinyl monomer unit) is an a range of 100:0 to 50:50, and a polymerization type of the copolymer chain of the conjugated diene monomer and the aromatic vinyl monomer is a random type, the conjugated diene polymer chain being obtained by (a) causing, by use of a polymerization initiator, an isoprene monomer or a monomer mixture containing an isoprene monomer to be subjected to living polymerization in an inert solvent, so as to form an isoprene block having an active terminal, then, (b) causing a conjugated diene monomer or a monomer mixture containing a conjugated diene monomer to be bound to the isoprene block, so that the conjugated diene monomer or the monomer mixture containing the conjugated diene monomer is subjected to the living polymerization again; and
causing the active terminal of the conjugated diene polymer chain and a denaturing agent to be reacted with each other, the denaturing agent (I) having, per molecule, at least one of (1) one or more epoxy groups and (2) one or more hydrocarbyloxysilyl groups, and (II) being such that a total number of the number of the one or more epoxy groups per molecule and the number of hydrocarbyloxy groups in the one or more hydrocarbyloxysilyl groups per molecule is not less than 3, the reacting being carried out so that a ratio of (i) a total number of mols of the one or more epoxy groups in the denaturing agent reacted with the active terminal of the conjugated diene polymer chain, and mols of the hydrocarbyloxy groups in the one or more hydrocarbyloxysilyl groups in the denaturing agent, to (ii) 1 mol of the polymerization initiator used in the living polymerization, is in a range of 0.1 to 5.

* * * * *